United States Patent
Liu et al.

(10) Patent No.: US 10,165,446 B2
(45) Date of Patent: *Dec. 25, 2018

(54) METHODS AND SYSTEMS FOR ENABLING COMMUNICATION WITH A RECEIVER DEVICE IN A NETWORK

(71) Applicant: Tencent Technology (Shenzhen) Company Limited, Shenzhen (CN)

(72) Inventors: Chenglin Liu, Shenzhen (CN); Liangliang Fan, Shenzhen (CN); Xiangyao Lin, Shenzhen (CN); Rungui Ye, Shenzhen (CN); Can Liu, Shenzhen (CN); Kai Liu, Shenzhen (CN); Jinhai Liu, Shenzhen (CN); Lejun Liu, Shenzhen (CN)

(73) Assignee: TENCENT TECHNOLOGY (SHENZHEN) COMPANY LIMITED, Shenzhen, Guangdong Province (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/901,675

(22) Filed: Feb. 21, 2018

(65) Prior Publication Data

US 2018/0184294 A1     Jun. 28, 2018

Related U.S. Application Data

(63) Continuation of application No. 14/994,013, filed on Jan. 12, 2016, now Pat. No. 9,949,120, which is a
(Continued)

(30) Foreign Application Priority Data

Dec. 4, 2013   (CN) .......................... 2013 1 0648318

(51) Int. Cl.
 *H04W 12/06* (2009.01)
 *H04L 1/00* (2006.01)
 (Continued)

(52) U.S. Cl.
 CPC ........... *H04W 12/06* (2013.01); *H04L 1/0079* (2013.01); *H04L 63/0428* (2013.01);
 (Continued)

(58) Field of Classification Search
 CPC ..... H04W 60/00; H04W 12/06; H04W 12/04; H04W 61/35; H04W 4/005; H04W 12/08;
 (Continued)

(56) References Cited

U.S. PATENT DOCUMENTS 9,949,120 B2 *  4/2018  Liu ....................... H04W 12/06
2006/0256750 A1  11/2006  Van Bemmel
(Continued)

FOREIGN PATENT DOCUMENTS

CN    101715184 A    5/2010
CN    102164423 A    8/2011
(Continued)

OTHER PUBLICATIONS

Tencent Technology, ISRWO, PCT/CN2014/093037, dated Feb. 17, 2015, 8 pgs.
(Continued)

*Primary Examiner* — Kibrom T Hailu
(74) *Attorney, Agent, or Firm* — Morgan, Lewis & Bockius LLP

(57) ABSTRACT

This application discloses a data transfer method for transferring information concerning a service set associated with a communication network. An electronic device obtains a plurality of data packets that comply with a specific data format corresponding to a network access protocol, and each data packet includes a respective header that further includes
(Continued)

at least one data field. A service set identifier (SSID) data set is arranged in the at least one data field of the plurality of data packets according to a link layer data structure. The SSID data set at least includes a SSID and a SSID password, and identifies a wireless network that transmits the plurality of data packets and is accessible when the SSID password is verified. The data packets that include the SSID data set are encrypted, and to a receiver device that is communicatively coupled to the electronic device via the identified wireless network.

20 Claims, 16 Drawing Sheets

Related U.S. Application Data continuation of application No. PCT/CN2014/093037, filed on Dec. 4, 2014.

(51) Int. Cl.
| | | |
|---|---|---|
| *H04W 4/20* | (2018.01) | |
| *H04L 29/06* | (2006.01) | |
| *H04W 12/04* | (2009.01) | |
| *H04W 84/12* | (2009.01) | |
| *H04W 4/70* | (2018.01) | |
| *H04W 4/80* | (2018.01) | |

(52) U.S. Cl.
CPC ............ *H04L 63/083* (2013.01); *H04W 4/20* (2013.01); *H04W 12/04* (2013.01); *H04L 63/162* (2013.01); *H04L 69/14* (2013.01); *H04L 69/22* (2013.01); *H04W 4/70* (2018.02); *H04W 4/80* (2018.02); *H04W 84/12* (2013.01)

(58) Field of Classification Search
CPC ....... H04W 8/20; H04W 12/02; H04W 84/12; H04W 4/20; H04W 4/008; H04L 1/0079; H04L 41/12; H04L 63/0428; H04L 63/0435; H04L 63/0083; H04L 63/162; H04L 69/14; H04L 69/22
See application file for complete search history.

(56) References Cited

U.S. PATENT DOCUMENTS

| | | |
|---|---|---|
| 2007/0101136 A1 | 5/2007 | Lai et al. |
| 2010/0082999 A1 | 4/2010 | Ando et al. |
| 2011/0173309 A1 | 7/2011 | Igarashi |
| 2013/0081113 A1 | 3/2013 | Cherian et al. |
| 2014/0126564 A1 | 5/2014 | Chou et al. |
| 2014/0226817 A1 | 8/2014 | Von Huben et al. |
| 2015/0065088 A1 | 3/2015 | Wu |

FOREIGN PATENT DOCUMENTS

| | | |
|---|---|---|
| CN | 102711282 A | 10/2012 |
| CN | 103281759 A | 9/2013 |
| CN | 103298072 A | 9/2013 |
| CN | 103336929 A | 10/2013 |
| CN | 104144034 A | 11/2014 |

OTHER PUBLICATIONS

Tencent Technology, IPRP, PCT/CN2014/093037, dated Jun. 7, 2016, 6 pgs.

* cited by examiner

32

34

| 0 | x | x | x | Length (high) |
|---|---|---|---|---|
| 0 | x | x | x | Length (low) |
| 0 | x | x | x | SSID Integrity (high) |
| 0 | x | x | x | SSID Integrity (low) |
| 0 | x | x | x | Receiver ID 1 |
| 0 | x | x | x | Receiver ID 2 |
| 0 | x | x | x | Receiver ID 3 |
| 0 | x | x | x | Receiver ID 4 |
| 1 | 1 | 1 | 1 | 1 | 1 | 1 | 1 |
| 1 | 1 | Sequence Integrity (Lower 6 bits) |
| 1 | 1 | Sequence Index |
| 1 | 0 | SSID Password 1 |
| 1 | 0 | SSID Password 2 |
| 1 | 0 | Random Number 1 |
| 1 | 0 | Random Number 2 |
| 1 | 0 | SSID 1 |
| 1 | 0 | SSID 2 |

Data Control Header 402

Prefix Code Field 404

Data Sequence Field 406

Sequence Header Field 406A

Data Field 406B

At a computational device having one or more processors and
memory storing program modules to be executed by the one or more
processors:
— 50

Obtaining a plurality of data packets that comply with a specific data
format corresponding to a network access protocol, wherein each
data packet comprises a respective header that further includes at
least one data field 502

Arranging a service set identifier (SSID) data set in the data fields of
the plurality of data packets according to a link layer data structure,
wherein the SSID data set at least comprises a SSID and a SSID
password, and the SSID identifies a wireless network that transmits
the plurality of data packets and is accessible when the SSID
password is verified 504

Encrypting the plurality of data packets that include the SSID data
set 506

Sending the plurality of encrypted data packets to a receiver client
device that is communicatively coupled to the computational device
via the identified wireless network 508

FIG. 5

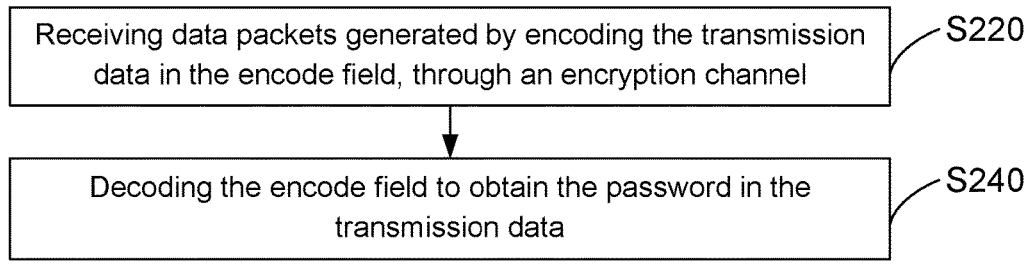
FIG. 18
| WIFI encryption manner | The difference between the length of the UDP broadcast packet sent by the sending end and the value of field Length monitored by the receiving end |
|---|---|
| AES | 52 |
| TKIP | 56 |
| RC4 | 44 |
FIG. 19
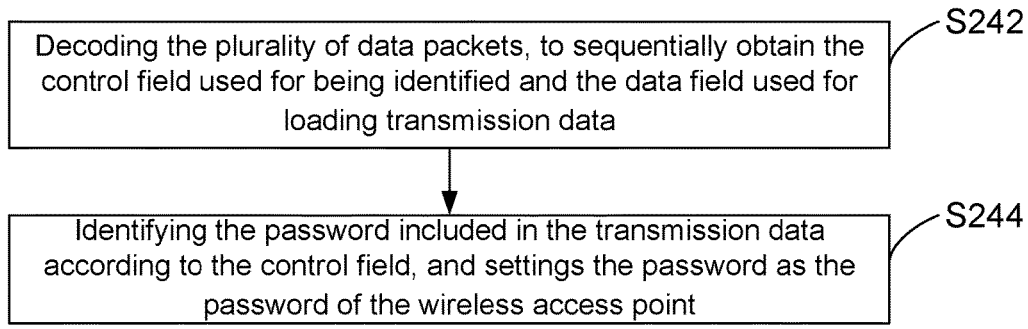
FIG. 20
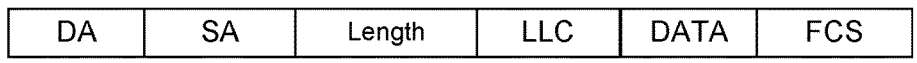
| DA | SA | Length | LLC | DATA | FCS |
FIG. 21
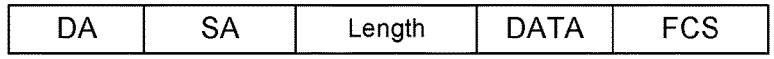
| DA | SA | Length | DATA | FCS |
FIG. 22

METHODS AND SYSTEMS FOR ENABLING COMMUNICATION WITH A RECEIVER DEVICE IN A NETWORK

RELATED APPLICATIONS

This application is a continuation application of U.S. patent application Ser. No. 14/994,013, entitled "METHODS AND SYSTEMS FOR ENABLING COMMUNICATION WITH A RECEIVER DEVICE IN A NETWORK", filed on Jan. 12, 2016, which is a continuation application of PCT Patent Application No. PCT/CN2014/093037, entitled "METHODS AND SYSTEMS FOR ENABLING COMMUNICATION WITH A RECEIVER DEVICE IN A NETWORK" filed on Dec. 4, 2014, which claims priority to Chinese Patent Application No. 201310648318.6, entitled "PASSWORD SHARING AND ACQUIRING METHOD AND SYSTEM" filed on Dec. 4, 2013, all of which are incorporated by reference in their entirety.

TECHNICAL FIELD

The disclosed implementations relate generally to computer network technology, and in particular, to sharing specific data (such as passwords) over a wireless network and thereby enabling communication with a receiver device coupled on the network.

BACKGROUND

As network technology develops, a large number of electronic devices (such as computers, mobile phones and small appliances) are communicatively coupled on a wireless network. These electronic devices have to obtain a service set identifier (SSID) associated with the wireless network and a corresponding SSID password to log into the wireless network and communicate with other devices via the network. However, many electronic devices have small form factors, require low power consumptions, and therefore, do not include conventional input and output devices (e.g., keyboards and touch displays) for receiving input of the SSID and the SSID password. Therefore, it has become a challenge to communicate such network information to many electronic devices before they can be coupled to the network.

Sometimes, a peripheral communication component may be integrated in an electronic device to allow it to communicate with other electronic devices and receive useful data. For example, an electronic device may include a Bluetooth module, a near field communication module or the like. However, usage of such a peripheral communication component increases the cost of the electronic device, while communication based on the component are not necessarily made more convenient.

SUMMARY

The above deficiencies and other problems associated with the conventional approaches of network communication are reduced or eliminated by the application disclosed below. In some embodiments, the application is implemented in an electronic device that has one or more processors, memory and one or more modules, programs or sets of instructions stored in the memory for performing multiple functions. Instructions for performing these functions may be included in a computer program product configured for execution by one or more processors.

One aspect of the application is a data transfer method. The method includes obtaining a plurality of data packets that comply with a specific data format corresponding to a network access protocol, and each data packet includes a respective header that further includes at least one data field. The method further includes arranging a service set identifier (SSID) data set in the at least one data field of the plurality of data packets according to a link layer data structure. The SSID data set at least includes a SSID and a SSID password, and the SSID identifies a wireless network that transmits the plurality of data packets and is accessible when the SSID password is verified. The method further includes encrypting the plurality of data packets that include the SSID data set, and sending the plurality of encrypted data packets to a receiver device that is communicatively coupled to the electronic device via the identified wireless network.

Another aspect of the application is another data transfer method. The method includes obtaining a plurality of data packets that comply with a specific data format corresponding to a network access protocol, and each data packet includes a respective header that further includes at least one data field. The method further includes extracting a service set identifier (SSID) data set from the at least one data field of the plurality of data packets according to a link layer data structure. The SSID data set at least includes a SSID and a SSID password, and the SSID identifies a wireless network that transmits the plurality of data packets and is accessible when the SSID password is verified. The method further includes determining whether the SSID data set are properly transferred from a master device to the receiver device, and in accordance with a determination that the SSID data set has been properly transferred to the receiver device, accessing the identified wireless network associated with the SSID and the SSID password that are included in the SSID data set.

Another aspect of the application is a master device that includes one or more processors and memory having at least one program (including instructions) stored thereon, which when executed by the one or more processors cause the processors to perform operations to obtain a plurality of data packets that comply with a specific data format corresponding to a network access protocol. Each data packet includes a respective header that further includes at least one data field. The at least one program further includes instructions to arrange a service set identifier (SSID) data set in the at least one data field of the plurality of data packets according to a link layer data structure. The SSID data set at least includes a SSID and a SSID password, and the SSID identifies a wireless network that transmits the plurality of data packets and is accessible when the SSID password is verified. The at least one program further includes instructions to encrypt the plurality of data packets that include the SSID data set, and to send the plurality of encrypted data packets to a receiver device that is communicatively coupled to the electronic device via the identified wireless network.

Other embodiments and advantages may be apparent to those skilled in the art in light of the descriptions and drawings in this specification.

BRIEF DESCRIPTION OF DRAWINGS

The aforementioned implementation of the present disclosure as well as additional implementations will be more clearly understood as a result of the following detailed description of the various aspects of the present disclosure when taken in conjunction with the drawings.

FIG. 4B illustrates an exemplary SSID data set configured according to a link layer data structure shown in FIG. 4A in accordance with some embodiments.

FIG. 5 illustrates a flow chart of an exemplary data transfer method that transfers a SSID and a SSID password associated with a wireless network in accordance with some embodiments.

FIG. 18 is a flow chart of a password acquiring method in accordance with some embodiments.

FIG. 19 is a modification table showing differences of data packet lengths of data packets that are sent by a master device and monitored by a receiver device, respectively, in accordance with some embodiments.

FIG. 20 is a flow chart of a flow chart of an operation (S240) of decoding the encode field to obtain the password that is included in the password acquisition method as shown in FIG. 18 in accordance with some embodiments.

FIGS. 21 and 22 are schematic diagrams of two data packets having an Ethernet 802.2 data format and an Ethernet 802.3 data format, respectively, in accordance with some embodiments.

Like reference numerals refer to corresponding parts throughout the drawings.

DETAILED DESCRIPTION

Reference will now be made in detail to embodiments, examples of which are illustrated in the accompanying drawings. In the following detailed description, numerous specific details are set forth in order to provide a thorough understanding of the subject matter presented herein. But it will be apparent to one skilled in the art that the subject matter may be practiced without these specific details. The appended drawings, however, merely illustrate the more pertinent features of the present disclosure and are therefore not to be considered limiting, for the description may admit to other effective features. In other instances, well-known methods, procedures, components, and circuits have not been described in detail so as not to unnecessarily obscure aspects of the embodiments.

The technical scheme of the embodiment of the application will now be described in connection with the accompanying drawings in the embodiments of the application. Obviously, some but not all embodiments of the application are described. Based on the embodiments of the application, other embodiments obtained by people having ordinary skill in the art are also included in the protective scope of the application.

Unless there is special definition, all the present application technique and science terms used herein have the same meanings as those understood by the skilled of the technique field of the present application. The terms used herein for the description of password sharing and acquiring methods and systems are merely for describing particular embodiments, but not intended to limit the application. The term "and/or" used herein means any combination of one or more listed items.

Figure 1:
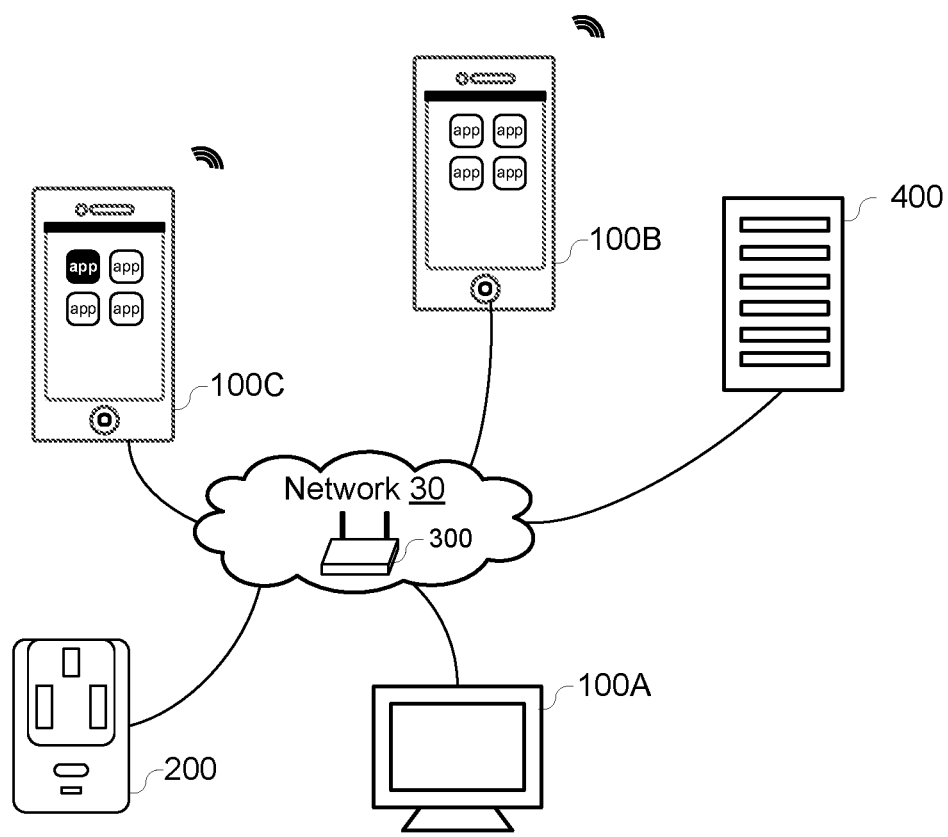
FIG. 1 illustrates an exemplary service set that includes a plurality of electronic devices associated with a communication network in accordance with some embodiments.

FIG. 1 illustrates an exemplary service set 10 that includes a plurality of electronic devices (e.g., devices 100, 200 and 400) associated with a communication network 30 in accordance with some embodiments. The electronic devices are communicatively coupled on communication network 30 via a wireless access point (AP) 300. Each of the electronic devices may preferably include, but is not limited to, a desktop or laptop computer 100A, a mobile phone 100B or 100C, a tablet computer, or a Personal Digital Assistant (PDA). Service set 10 also includes a server 400 which may also be regarded as an electronic device. Communication network 30 includes, but in not limited to, the Internet, intranets, local area networks (LANs), cellular networks, Ethernet, Storage Area Networks (SANs), telephone networks, Bluetooth communication and the like.

Service set 100 is associated with a service set identifier (SSID) that differentiates communication network 30 from any other communication network. Access point 300 and electronic devices 100, 200 and 400 must use the same SSID to access the same communication network (e.g., network 30). In one specific example, a SSID is a unique identifier that includes 32 case sensitive alphanumeric characters, and acts as a password when a mobile device (e.g., device 100B) tries to connect to service set 10 associated with communication network 30. Under some circumstances, the SSID is attached to a header of every data packet sent over communication network 30.

In some implementations, the SSID of service set 100 is further associated with a SSID password. An electronic device has to provide both the SSID and the SSID password to connect to service set 10 associated with communication network 30. An electronic device not only has to encode a data packet according to the SSID and the SSID password before it distributes the data packet on communication network 30, but also has to decode a data packet when it receives the data packet via communication network 30 according to the SSID and the SSID password.

In many embodiments, the SSID and the SSID password are defined for an electronic device included in service set 10 based on a user's input, selection or confirmation. However, as discussed in the background of the application, some electronic devices (e.g., device 200) do not include a keyboard or a touch display that allows a user to manually input the SSID and/or the SSID password. In accordance with some embodiments of this application, such electronic devices receive the SSID and the SSID password from another electronic device that is included in the same service set 10 associated with communication network 30. The receiver devices thereby recover the SSID and the SSID password from one or more data packets transferred from the other electronic device. The recovered SSID information is then used to decode data packets received at the receiver devices via communication network 30 and encode data packets that are broadcasted by the receiver devices.

In one specific example, a receiver device is a smart sensor device that is controlled by another master computer for wireless energy management. The smart sensor device is plugged onto a wall power outlet. Due to its small form factor and low cost requirements, the smart sensor device may include a limited number of control switches or buttons, but does not include any display or keyboard. This smart sensor device has to rely on a communication network to receive instructions from the master computer and return sensing data back to the master computers for further analysis. Therefore, the smart sensor device has to receive the SSID information to access the communication network for the purposes of receiving the instructions and returning the sensing data.

Despite this specific example, one of those skilled in the art may see that, in some embodiments, a receiver device may include an input/output interface for receiving the input of the SSID or the SSID password, but chooses to receive the SSID or the SSID password from another electronic device of service set 10.

In accordance with some embodiments of this application, a SSID data set (including the SSID and the SSID password) is coded in a specific data field of a data packet. When the specific data field of one data packet is not sufficient to include all information of the SSID data set, a sequence of data packets are involved, and the SSID data set is coded in the specific data fields of multiple data packets based on a specific link layer data structure. The specific data fields includes either plain texts that are not encrypted or encrypted data that are encrypted with an encryption method that is known to a receiver device. As such, when it is first coupled to communication network 30, the receiver device may conveniently receive the SSID data set from another master device, recovers the SSID and the SSID password, and obtain an authorized access to communication network 30.

Figure 2B:
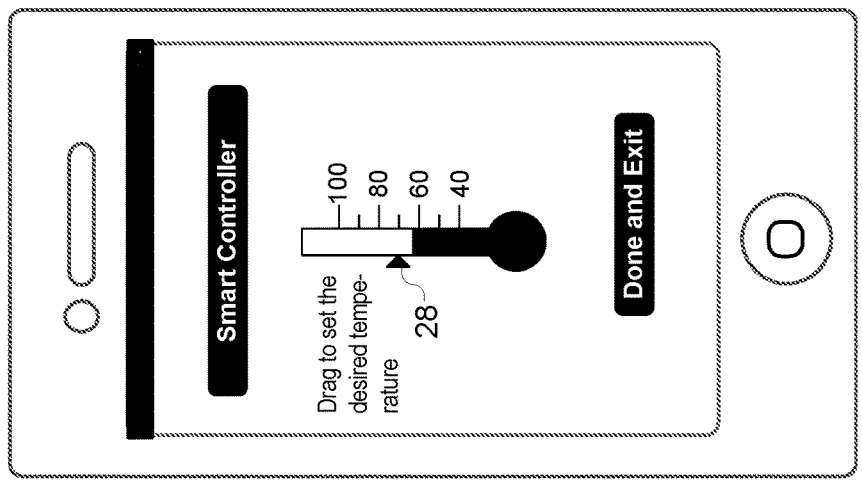
FIG. 2B illustrates an exemplary user interface that controls a receiver device after the receiver device is coupled on the network using the SSID and the SSID password in accordance with some embodiments.
Figure 2A:
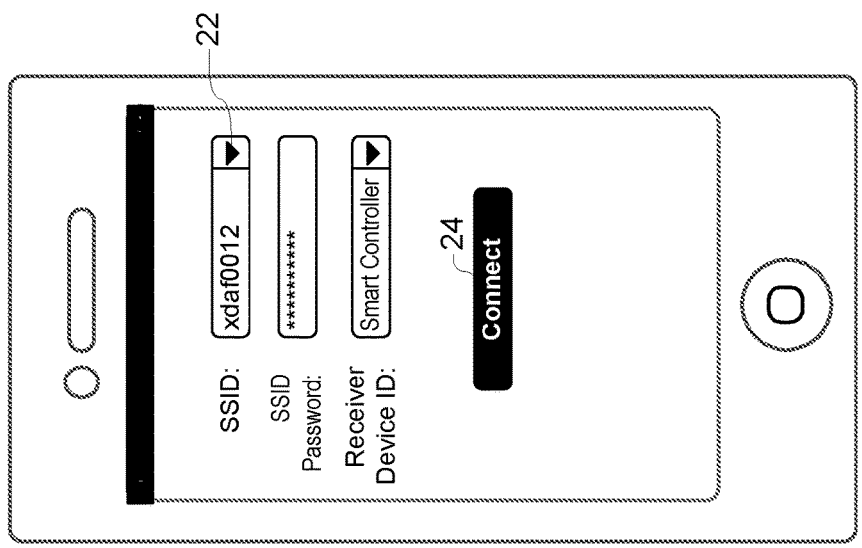
FIG. 2A illustrates an exemplary user interface that receives user inputs of a SSID, a SSID password, a receiver device identifier, and a SSID share request in accordance with some embodiments.

FIG. 2A illustrates an exemplary user interface 20 that receives user inputs of a SSID, a SSID password, a receiver device identifier, and a SSID share request in accordance with some embodiments. The user interface 20 is displayed on a master electronic device that provides the SSID data set to a receiver device. Optionally, a user of the master device manually inputs the SSID or the SSID password of service set 10. Optionally, the user clicks on items 22 to open a list of SSIDs each of which is associated with an available communication network, and then chooses one of these SSIDs.

In some embodiments, the receiver device that is designated to receive the SSID data set is uniquely associated with a receiver device identifier. The receiver device identifier is often assigned by the manufacturer of the receiver device and provided upon the sale of the receiver device. The user of the master device optionally inputs the receiver device identifier, or selects a receiver device identifier from a list of receiver device identifiers.

Then, the user issues a SSID share request by clicking on a button 24. Upon receiving the SSID share request, the master device includes the SSID and the SSID password in a specific data field of one or more data packets based on a link layer data structure. The one or more data packets including the SSID data set is then communicated to the receiver device.

Assume the receiver device obtains the SSID data set requested based on user interface 20 and gains authorized access to communication network 30. FIG. 2B illustrates an exemplary user interface 26 that controls a receiver device after the receiver device is coupled on the network using the SSID and the SSID password in accordance with some embodiments. The user interface 26 is displayed on a master electronic device. The receiver device returns temperature data via communication network 30, and such temperature data are displayed on user interface 26. In some embodiments, a user of the master device sets forth a target temperature by dragging a tick 28 on user interface 26, and click button "Done and Exit" to issue a temperature control command to the receiver device via communication network 30. Then, when the receiver device receives one or more data packets via communication network 30, it obtains the temperature control command by decoding the one or more data packets based on the SSID data set previously provided by the master device.

In some implementations, user interfaces 20 and 26 are included in a social network platform, such as WeChat, WhatsApp, Link and Facebook. A user may directly access and control an electronic device via such user interfaces of this social network platform.

Figure 3A:
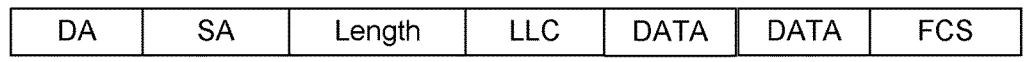
FIG. 3A illustrates an exemplary data format corresponding to a network access protocol (e.g., IEEE 802.2 SNAP) in accordance with some embodiments.
Figure 3B:
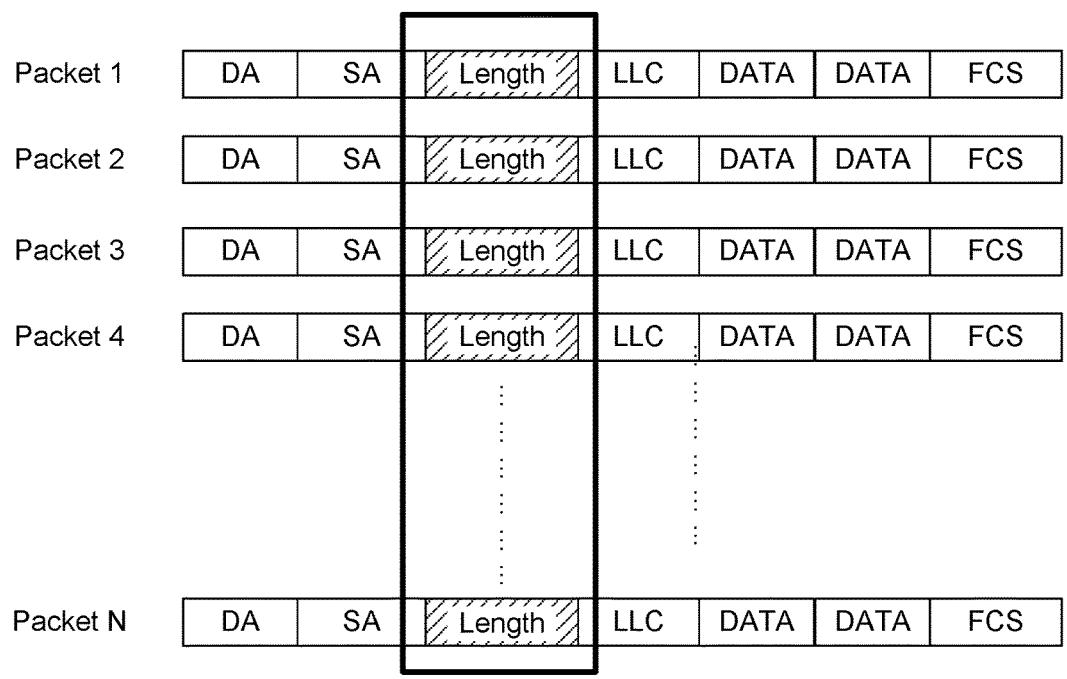
FIG. 3B illustrates a sequence of data packets each of which has a data format corresponding to a network access protocol (e.g., IEEE 802.2 SNAP) in accordance with some embodiments.

FIG. 3A illustrates an exemplary data format 32 corresponding to a network access protocol (e.g., IEEE 802.2 SNAP) in accordance with some embodiments, and FIG. 3B illustrates a sequence of data packets 34 each of which has a data format corresponding to a network access protocol (e.g., IEEE 802.2 SNAP) in accordance with some embodiments. Here, data packets are configured according to data format 32, when they are communicated on a communication network based on the network access protocol. According to data format 32, a data packet includes a packet header, two data fields (DATA) and a frame check sequence (FCS). In this specific example, the packet header further includes a destination address (DA) field, a source address (SA) field, a length field, and a logical link control (LLC) field. The data fields include data (such as the above temperature control command). The frame check sequence includes integrity data that are generated from the data of the data field according to an integrity check method. A receiver device determines whether the data of the data field are accurate and consistent with original data generated at the master device based on the frame check sequence.

In some implementations, the data of the data field are encrypted, and however, a receiver device cannot decrypt the data of the data field without the SSID or the SSID password associated with communication network 30. However, the packet header is either unencrypted or encrypted with a known encryption method, such that the receiver device may easily extract information contained in the packet header without using the SSID data set. In accordance with some embodiments of the application, a data field in the packet header is used to communicate the SSID data set to a receiver device. The receiver device retrieves the SSID data set from the designated data field in the packet header, and then uses the SSID data set to decode the data fields (DATA) of subsequent data packets received over communication network 30. In one example, the length field of the packet header is used to communicate the SSID data set (including the SSID or the SSID password). In some embodiments, the data fields (DATA) of the subsequent data packets include commands (e.g., the temperature control command in FIG. 2B) for controlling the receiver device.

Figure 4A:
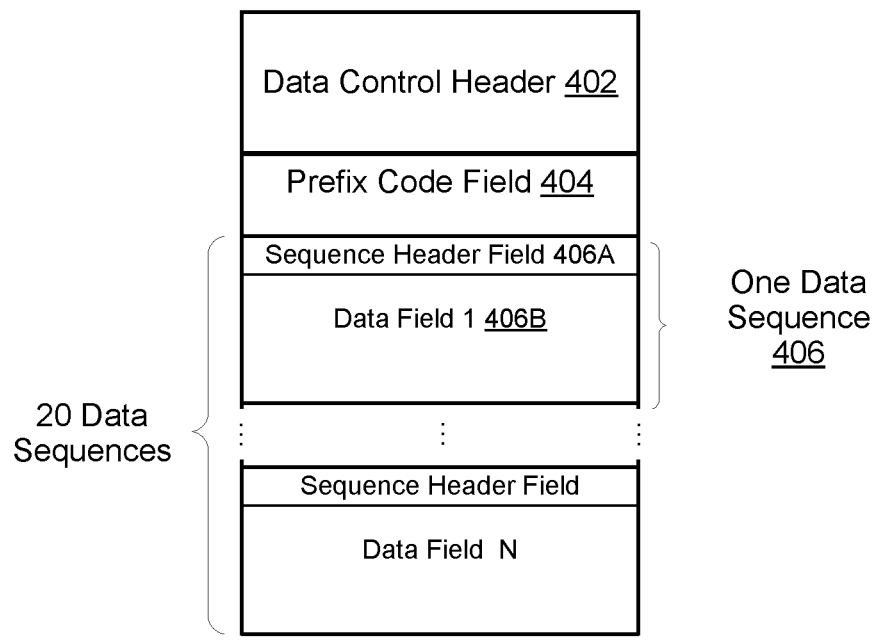
FIG. 4A illustrates an exemplary link layer data structure used to configure a SSID data set in accordance with some embodiments.

In some implementations, the SSID data set is coded in a respective data field (e.g., a length field) of each packet of the data packet sequence 34 based on a link layer data structure. FIG. 4A illustrates an exemplary link layer data structure 40 used to configure a SSID data set in accordance with some embodiments, and FIG. 4B illustrates an exemplary data set 42 configured according to a link layer data structure 40 in accordance with some embodiments. In accordance with link layer data structure 40, the respective data fields of the data packet sequence 34 together form data set 42. In some embodiments, data set 42 includes a number of data words having a fixed width (e.g., eight bits).

In accordance with link layer data structure 40, a SSID data set includes a data control header 402, a prefix code field 404, and a number of data sequences 406, and each data sequence further includes a sequence header 406A and a data field 406B. Optionally, data control header 402 defines one or more of a data length, a SSID integrity word and an identifier of a receiver device. Specifically, as shown in FIG. 4B, data control header 402 includes 8 bytes each of which includes 8 bits of data. The highest four bits are reserved for identifying these eight bytes as data control header 402, and in particular, the highest bit has a fixed value of "1." The lowest four bits of these eight bytes are used to define the relevant information, e.g., two bytes for the data length, two bytes for SSID integrity, and four bytes for the receiver identifier.

In some embodiments, the data length included in data control header 402 is the total length of data set 42 or the length of data control header 402. In this application, data control header 402 is called as a magic code field.

Prefix code field 404 is followed by a number of data sequences, and therefore, it is used to indicate a start of such data sequences. In a specific example, a byte including eight bits of "1" is used to fill prefix code field 404.

In the specific example as shown in FIG. 4B, data sequence field 406 includes one data sequence that has a length of 8 bytes, including two bytes of sequence header field 406A and six bytes of data field 406B. To differentiate from data control header 402, each byte in data sequence field 406 starts with "1." Specifically, the highest two bits of sequence header field 406A are "11," and the highest two bits of data field 406B are "10." Further, the two bytes of sequence header field 406A includes a sequence integrity word and a sequence index, respectively. The sequence integrity word is generated from the data in data field 406B based on a data integrity check method, and thereby used to maintain the accuracy of the data in data field 406B. The sequence index is used to locate the specific data sequence within data sequence field 406, when data sequence field 406 includes two or more data sequences.

In some implementations, data field 406B includes at least a part of the SSID data set (including the SSID and the SSID password). When the SSID data set is relatively long and cannot be delivered within six bytes (i.e., more than one data sequence), the SSID data set are included in two or more data sequences in data set 40 with each data sequence identified with a sequence header field 406A. In some embodiments, the SSID data set is so long that it cannot be delivered within all the data sequences of 406 of one data set 40, and two or more data sets 40 having their respective data control headers and prefix code fields are used to transmit the SSID data set. As such, two or more data packets 34 are involved to include the long SSID data set and deliver it to the receiver device.

In some embodiments, the SSID data set includes a SSID of a service set associated with a communication network, a corresponding SSID password, and a random number. When a receiver device receives the random number, it broadcasts the random number back to a master device that sends the SSID data set to the receiver device and confirms to the master device that it has received the SSID data set.

In the example shown in FIG. 4B, data field 406B includes a two-byte SSID password followed by a two-byte random number that is further followed by a two-byte SSID. In accordance with a corresponding link layer data structure, data in data field 406B are arranged based on a specific order, and each of the data has a fixed length. When the respective data is less than the fixed length, the data are filled with "0" at their ends. However, in some embodiments, the data in data field 406B do not have a fixed length, but are ended with a specific sequence of data, e.g., four bits of "0000." In a specific example, the receiver device used the first data ended with "0000" in data field 406B as a SSID password, the second data ended with "0000" in data field 406B as a random number, and the third data ended with "0000" in data field 406B as a SSID.

More details on link layer data structure 40 and corresponding data set 42 are explained below with reference to FIGS. 13-17.

FIG. 5 illustrates a flow chart of an exemplary data transfer method 50 that transfers a SSID data set associated with a wireless network in accordance with some embodiments. Method 50 is, optionally, governed by instructions that are stored in a non-transitory computer readable storage medium and that are executed by one or more processors of an electronic device (e.g., device 100). Each of the operations shown in FIG. 5 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 50 may be combined and/or the order of some operations may be changed.

Method 50 is performed by an electronic device that obtains (502) a plurality of data packets that comply with a specific data format corresponding to a network access protocol. Each data packet includes a respective header that further includes at least one data field. A service set identifier (SSID) data set is arranged (504) in the at least one data field of the plurality of data packets according to a link layer data structure. The SSID data set at least includes a SSID and a SSID password, and the SSID identifies a wireless network that transmits the plurality of data packets and is accessible when the SSID password is verified. Further the electronic device encrypts (506) the plurality of data packets that include the SSID data set, and sends the plurality of encrypted data packets to a receiver device that is communicatively coupled to the electronic device via the identified wireless network.

In some implementations, each data packet includes a data field (e.g., DATA in FIG. 3A) that is encrypted by an encryption key before the respective data packet is transmitted by the wireless network, and the encryption key is distinct from the SSID password.

In some implementations, the plurality of encrypted data packets is sent to the receiver device via a wireless access point 300 that is also is communicatively coupled on the identified wireless network.

In some implementations, the SSID is associated with a service set of access point devices that are communicatively coupled on the wireless network, and the service set includes the electronic device that implements data transfer method 50.

In some implementations, as shown in FIG. 2A, the electronic device obtains a plurality of data packets by generating a user interface that includes a plurality of user input spaces for receiving inputs of the SSID, the SSID password and a SSID share request; in accordance with a user input of the SSID, displaying the SSID on one of the plurality of user input spaces; and responding to the SSID share request by obtaining the SSID password and the SSID that are displayed in the corresponding user input spaces.

In some implementations, the at least one data field of each data packet includes plain data that the receiver device is configured to read without any password or encryption key.

In some implementations, the network access protocol associated with the plurality of data packets is selected from an IEEE protocol group consisting of Ethernet 802.2 SNAP, Ethernet 802.2, Ethernet 802.3 SNAP, and Ethernet 802.3, and the at least one data field is included in a length field that defines a length of each data packet according to the network access protocol.

In some implementations, the SSID data set further includes a data control header and a data sequence field. In accordance with the link layer data structure, the data control header of the SSID data set optionally includes a data length, a receiver identification, and SSID integrity check data, and the data sequence field of the SSID data set optionally includes the SSID, the SSID password, and a random number.

In some embodiments, after sending the plurality of encrypted data packets that include the SSID data set to the receiver device, the electronic device further sends to the receiver device at least one data packet including a specific data field. The specific data field is encrypted based on the SSID data set and includes a command that controls the receiver device. The receiver device is configured to extract the command from the specific data field and decrypt it using the SSID data set (e.g., the password) and then perform operations in accordance with the command. With this configuration, a user can control the operation of the receiver device using the electronic device (e.g., a smartphone), both of which have installed appropriate software, through a wireless network (e.g., a wireless local area network or a wireless wide area network of a wireless carrier).

Figure 6:
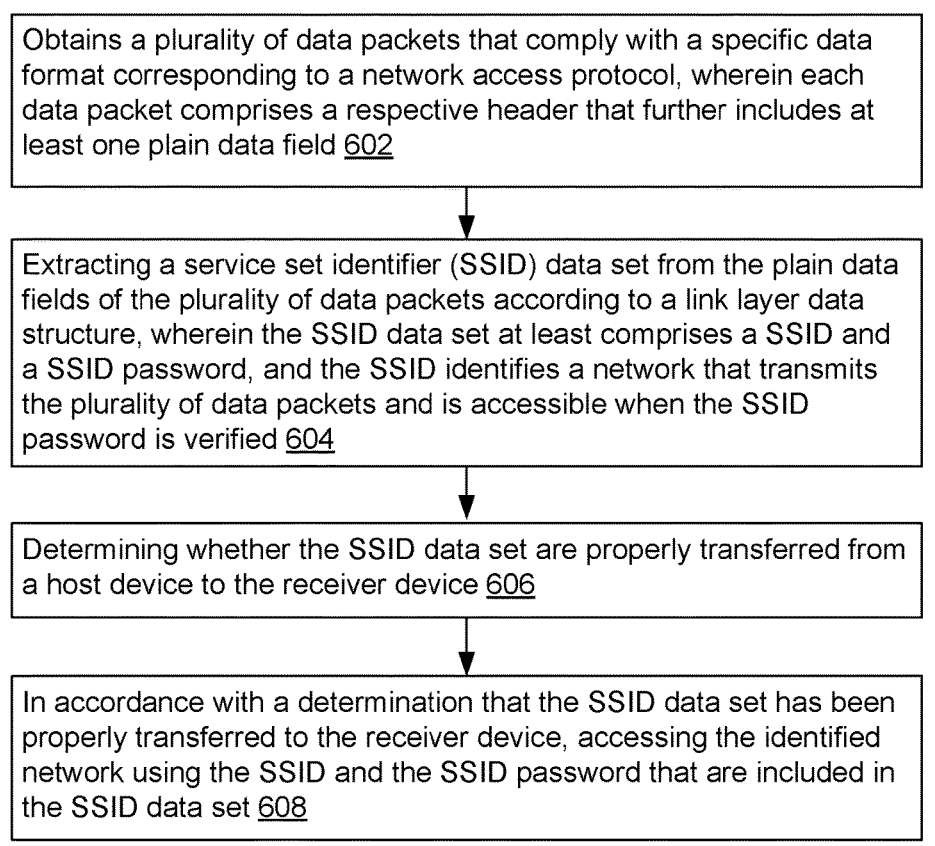
FIG. 6 illustrates a flow chart of another exemplary data transfer method that transfers a SSID and a SSID password associated with a wireless network in accordance with some embodiments.

FIG. 6 illustrates a flow chart of another exemplary data transfer method that transfers a SSID and a SSID password associated with a wireless network in accordance with some embodiments. Method 60 is, optionally, governed by instructions that are stored in a non-transitory computer readable storage medium and that are executed by one or more processors of an electronic device (e.g., device 100 or 200). Each of the operations shown in FIG. 6 may correspond to instructions stored in a computer memory or non-transitory computer readable storage medium. The computer readable storage medium may include a magnetic or optical disk storage device, solid state storage devices such as Flash memory, or other non-volatile memory device or devices. The instructions stored on the computer readable storage medium may include one or more of: source code, assembly language code, object code, or other instruction format that is interpreted by one or more processors. Some operations in method 60 may be combined and/or the order of some operations may be changed.

Method 60 is performed by an electronic device that obtains (62) a plurality of data packets that comply with a specific data format corresponding to a network access protocol. Each data packet includes a respective header that further includes at least one data field. A service set identifier (SSID) data set is extracted (64) from the at least one data field of the plurality of data packets according to a link layer data structure. The SSID data set at least includes a SSID and a SSID password, and the SSID identifies a wireless network that transmits the plurality of data packets and is accessible when the SSID password is verified. The electronic device further determines (66) whether the SSID data set are properly transferred from a master device to the receiver device, and in accordance with a determination that the SSID data set has been properly transferred to the receiver device, accesses (68) the identified wireless network associated with the SSID and the SSID password that are included in the SSID data set.

It should be understood that the particular order in which the operations in FIGS. 5 and 6 have been described are merely exemplary and are not intended to indicate that the described order is the only order in which the operations could be performed. One of ordinary skill in the art would recognize various ways to cache and distribute specific data as described herein. Additionally, it should be noted that details of other processes described herein with respect to method 50 or 60 are also applicable in an analogous manner to each other described above with respect to FIGS. 5 and 6. For brevity, these details are not repeated here.

Figure 7:
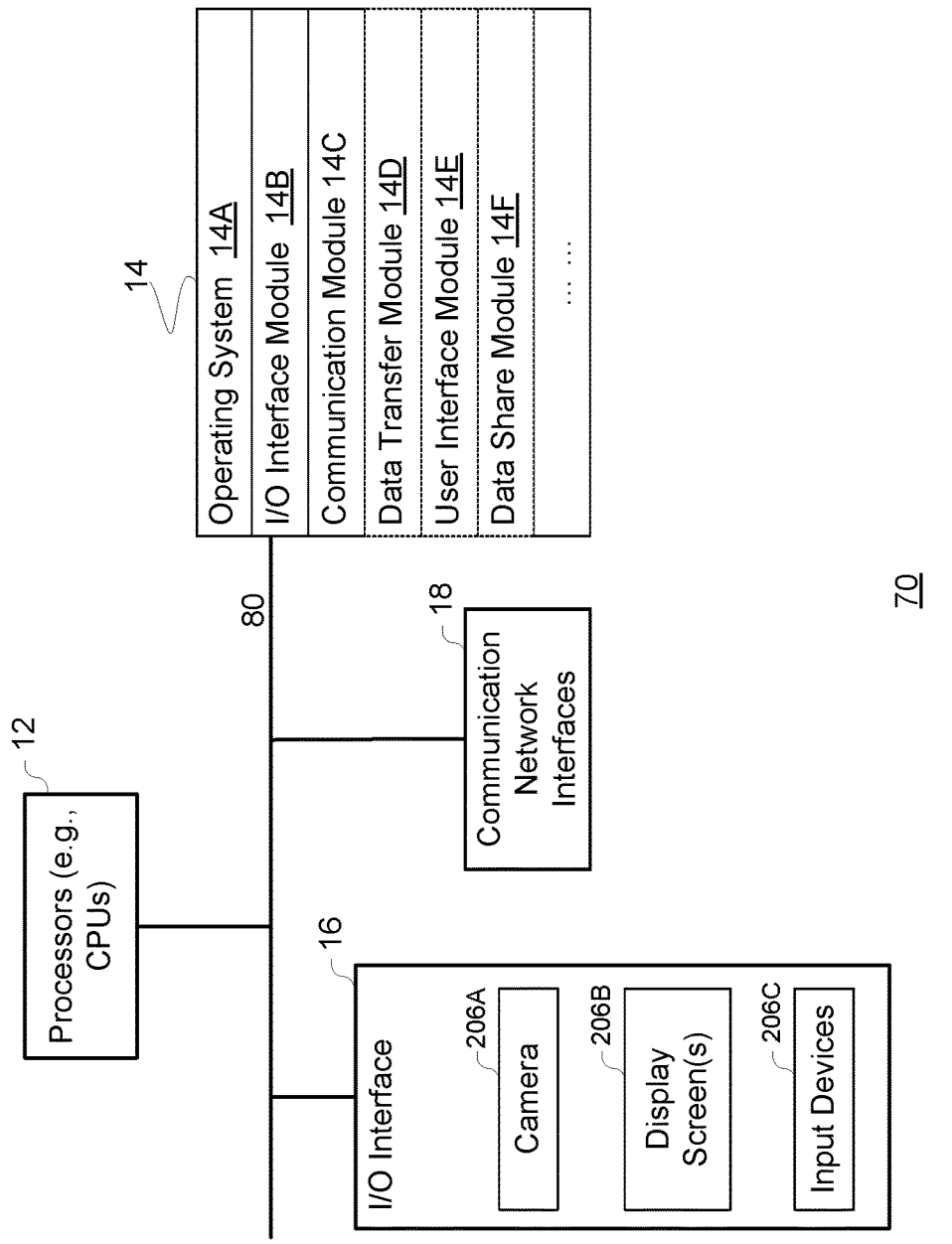
FIG. 7 illustrates a block diagram of an exemplary electronic device that transfers the SSID and the SSID password associated with a wireless network in accordance with some embodiments.

FIG. 7 illustrates a block diagram of an exemplary electronic device 70 (e.g., electronic device 100 or 200) that communicates the SSID and the SSID password associated with a wireless network in accordance with some embodiments. In some implementations, electronic device 100 includes one or more processors 12, memory 14 for storing programs and instructions for execution by one or more processors 12, one or more communications interfaces such as input/output interface 16 and network interface 18, and one or more communications buses 80 for interconnecting these components.

In some embodiments, input/output interface 16 includes a display and input devices such as a keyboard, a mouse or a track-pad. In some embodiments, communication buses 80 include circuitry (sometimes called a chipset) that interconnects and controls communications between system components. In some embodiments, memory 14 includes high-speed random access memory, such as DRAM, SRAM, DDR RAM or other random access solid state memory devices; and optionally includes non-volatile memory, such as one or more magnetic disk storage devices, optical disk storage devices, flash memory devices, or other non-volatile solid state storage devices. In some embodiments, memory 14 includes one or more storage devices remotely located from the one or more processors 12. In some embodiments, memory 14, or alternatively the non-volatile memory device (s) within memory 14, includes a non-transitory computer readable storage medium.

In some embodiments, memory 14 or alternatively the non-transitory computer readable storage medium of memory 14 stores the following programs, modules and data structures, instructions, or a subset thereof:

Operating system 14A that includes procedures for handling various basic system services and for performing hardware dependent tasks;

I/O module 14B that includes procedures for handling various basic input and output functions through one or more input and output devices; and Communication module 14C that is used for connecting electronic device 100 to other machines (e.g., other electronic devices in network 30) or servers (e.g., server 400) via one or more network communication interfaces 18 (wired or wireless) and one or more communication networks, such as the Internet, other wide area networks, local area networks, metropolitan area networks, and so on.

In some embodiments, electronic device 70 is associated with a master electronic device that provides the SSID data set to a receiver device, and its memory 14 further includes:

Data transfer module 14D that responds to a SSID share request by including a SSID data set in a data field of one or more data packets, configuring the SSID data set according to a link layer data structure and sending the configured SSID data set to a receiver data; and User interface module 14E that generates a user interface (e.g., interface 20) to receive user inputs of the SSID, the SSID password and/or the receiver identifier. In some implementations, user interface module 14E also generates a user interface (e.g., interfere 26) to display data received from the receiver device and receiver user inputs for controlling the receiver device.

In some embodiments, electronic device 70 is associated with a receiver device, and its memory 14 further includes:

Data share module 14F that obtains a SSID data set in a data field of one or more data packets, extracts the SSID data set, and determines whether the SSID data set are properly transferred from the master electronic device.

Figure 8:
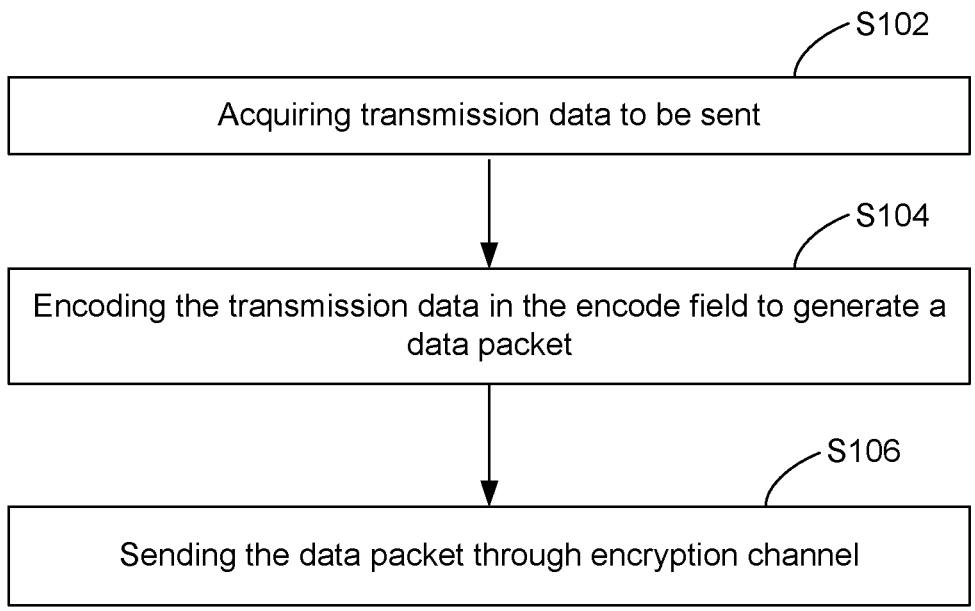
FIG. 8 is a flow chart of a password sharing method in accordance with some embodiments.

FIG. 8 is a flow chart of a password sharing method in accordance with some embodiments. The embodiments may be applied in terminals such as mobile phone, tablet computer etc. which are capable to send wireless signal, to share a password of a wireless network to receiving ends of wireless signal in hybrid mode listening space. As shown in FIG. 1, the password sharing method of the embodiments includes following steps:

S120, acquiring transmission data to be sent including a password. The transmission data is the user data which needed to be sent to receiving ends for wireless communication, but not the transmission control data automatically generated by the system for transmission process. The transmission data may also include a service set identifier (SSID) required at wireless access, and the password in the transmission data is the password of the service set identifier. The transmission data may be acquired by receiving user input, may be acquired through network, or may be acquired from a local memory of the sending end.

Figure 9:
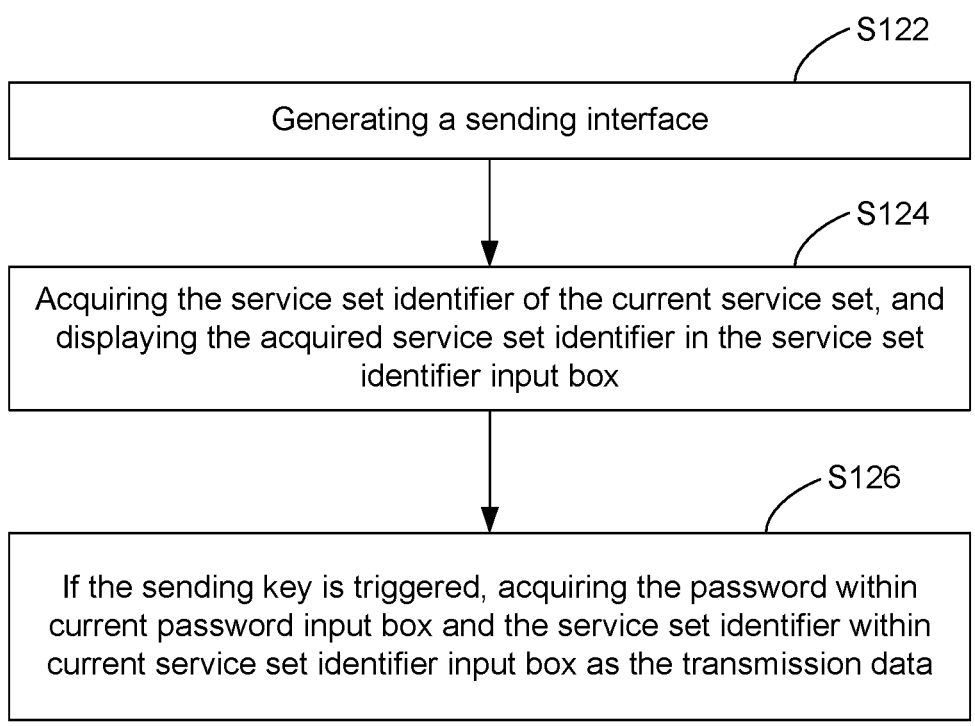
FIG. 9 is a flow chart of an operation (S102) of acquiring transmission data that is included in the password sharing method as shown in FIG. 8 in accordance with some embodiments.
Figure 10:
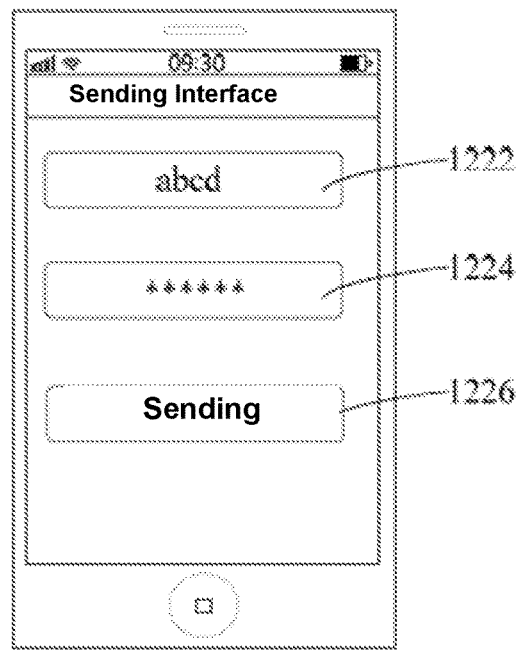
FIG. 10 is a schematic diagram of an exemplary user interface used to control the operation of acquiring transmission data as shown in FIG. 9 in accordance with some embodiments.

FIG. 9 is a flow chart of an operation (S102) of acquiring transmission data that is included in the password sharing method as shown in FIG. 8 in accordance with some embodiments. FIG. 10 is a schematic diagram of an exemplary user interface used to control the operation of acquiring transmission data as shown in FIG. 9 in accordance with some embodiments. Referring to FIG. 9 and FIG. 10, according to the embodiments, the step S120 includes following steps:

S122, generating a sending interface, which includes a service set identifier input box 1222, password input box 1224 and a sending key 1226. The user may input corresponding information in the service set identifier input box 1222 and the password input box 1224.

S124, acquiring the service set identifier of the current service set, and displaying the acquired service set identifier in the service set identifier input box 1222. The service set identifier of the service set in which the device currently locates may be automatically filled into the service set identifier input box 1222 through the background, thereby omitting the troublesome of filling service set identifier by the user. Certainly, as an option, the service set identifier may be inputted by the user manually.

S126, if the sending key 1226 is triggered, acquiring the password within current password input box 1224 and the service set identifier within current service set identifier input box 1222 as the transmission data. When the service set identifier filled automatically through the background is not the needed service set identifier to be sent by the user, the sent service set identifier is the one modified by the user. Because there may be a plurality of service sets at the same physical position, the user locating in one of the service sets may send a service set identifier and password of another service set. For example, in order to assurance the data security, when configuring the wireless access points, they are divided into an entertainment device service set, a working device service set and an intelligence device service set.

S140, encoding the transmission data in the encode field to generate a data packet, the encode field is a field in the data packet in which the content can be directly monitored on the encryption channel encrypted by a password. The encode field in which the content can be direct directly monitored refers to a field for exposing specific content in a wireless transmission procedure. As long as within the coverage of signal, any receiving end having wireless transmission function can obtain the specific concrete content of the encode field, even though without the password of the wireless communication. In many wireless communication modes, some information in a data packet are not necessary to be secreted, for example the length field and the like in data packet of 802.2 SNAP format, which are exposed directly. The transmission data may be transmitted in plaintext or transmitted with additional encryption, wherein the password for the encryption channel is different to the password for encrypting the transmission data. If the transmission data is encrypted, the receiving end may perform corresponding decryption, wherein the content of the transmission data may be directly obtained without influence from the encryption channel.

In one example, the encode field is a field which may directly controlled by normal application. Because of the limitation of operating system (for example IOS or Android) of a mobile terminal, a control authority of very high level is needed for the control for a field in which the content can be directly monitored, which those applications for coding is generally hard to get it. If a field that can be directly controlled by normal applications is selected as the encode field, a control authority of very high level is not needed to carry out the application of the embodiments, which is not only convenient for use but also keep the security of the system. In one example, the data packet may be in the format of Ethernet 802.2 SNAP, the encode field is the length field in the data packet in the format of Ethernet 802.2 SNAP. The data packet may be in the format of Ethernet 802.2, and the encode field is the length field in the data packet in the format of Ethernet 802.2. The data packet may be in the format of Ethernet 802.3, and the encode field is the length field in the data packet in the format of Ethernet 802.3. The data packet also may be in the format of Ethernet 802.3 SNAP, and the encode field is the length field in the data packet in the format of Ethernet 802.3 SNAP.

S160, sending the data packet through encryption channel. Particularly, the data packet is sent, for example, by using given frequency, power and the like according to the requirement of wireless communication after the data packet is generated.

With foregoing method, since the content of the encode field encoded with the transmission data may be directly monitored, the transmission data may be obtained even though the contents of other fields in the data packet are encrypted and thus cannot be known, thereby realizing object to send a password to a receiving end and receive and obtain the shared password by the receiving end. The receiving end may receive the password only through monitoring, without need of arrangement in advance to establish a connection with environment, and without need of peripheral input unit, thereby reducing the cost for information transmission and making the operation simple and convenient.

For the signal carrier, WIFI wireless signal may be adopted for information transfer. In step S160, the data packet may be user datagram protocol (UDP) based data packet or transmission control protocol (TCP) based data packet, which is forwarded through wireless access point. The wireless access point has large power, so that the coverage area of signal physical space of wireless communication may be increased by its forwarding. The service set identifier in the data packet is the identifier of the service set of the wireless access point, and the shared password is the password of the service set identifier.

In some embodiments, the data packet may be in the format of 802.2 SNAP, the encode field is the length field in the data packet in the format of 802.2 SNAP. 802.11 is a wireless LAN protocol set by IEEE, with which the IP packet is carried by the logic link control packaging of 802.2, therefore the wireless network data may be received with 802.2 SNAP format. If the hybrid mode of WIFI chip in the receiving end is enabled, the data packet as shown in FIG. 11 may be obtained by monitoring the wireless signal in space and intercepting the data from the data link layer with 802.2 SNAP format.

Figure 11:
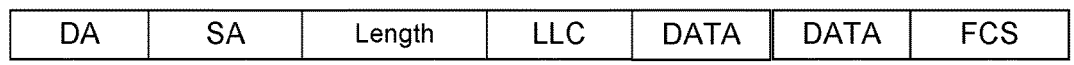
FIG. 11 is a schematic diagram of the data packet having a 802.2 SNAP data format in accordance with some embodiments.

The field Length in FIG. 11 represents the length of following data, which is above-mentioned length field. The field DA represents target MAC address, the field SA represents source MAC address, the field LLC represents LLC head (Logical Link Control), and the field SNAP includes a vendor code of 3 bytes and a protocol type identification of 2 bytes. DATA area (data area) is the load, which is cipher text with respect to an encryption channel, and a receiving end cannot know the specific content of the data area before obtaining the password of the encryption channel. The field FCS represents frame checking sequence. With respect to the monitor of the wireless signal namely the receiving end, the fields DA, SA, Length, LLC, SNAP, FCS are always exposed regardless the encryption of the wireless channel, which may be directly monitored. Therefore, by using the field Length in which the content can be directly monitored and can be directly controlled by normal application, the application for coding in the sending end may has convenient control by changing the length of the data packet sent according to the need.

Figure 12:
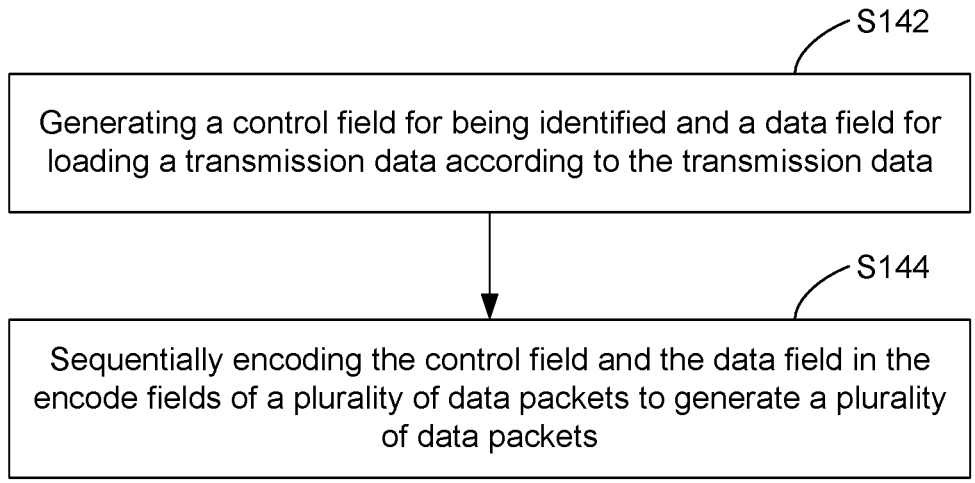
FIG. 12 is a flow chart of an operation (S104) of encoding the transmission data in the encode field to generate a data packet that is included in the password sharing method as shown in FIG. 8 in accordance with some embodiments.

Since each data packet can carry fewer data, in some embodiments, one whole transmission data is sent through a data packet set consisting of a plurality of data packets. FIG. 12 is a flow chart of an operation (S104) of encoding the transmission data in the encode field to generate a data packet that is included in the password sharing method as shown in FIG. 8 in accordance with some embodiments. Referring to FIG. 12, the step S140 include:

S142, generating a control field for being identified and a data field for loading a transmission data according to the transmission data.

S144, sequentially encoding the control field and the data field in the encode fields of a plurality of data packets to generate a plurality of data packets.

By using the control field and data field, in the case that a single data packet has limited transmission data amount, a data transmission with its data amount larger than that of a single data packet may be realized by means of a data packet set.

Figure 13:
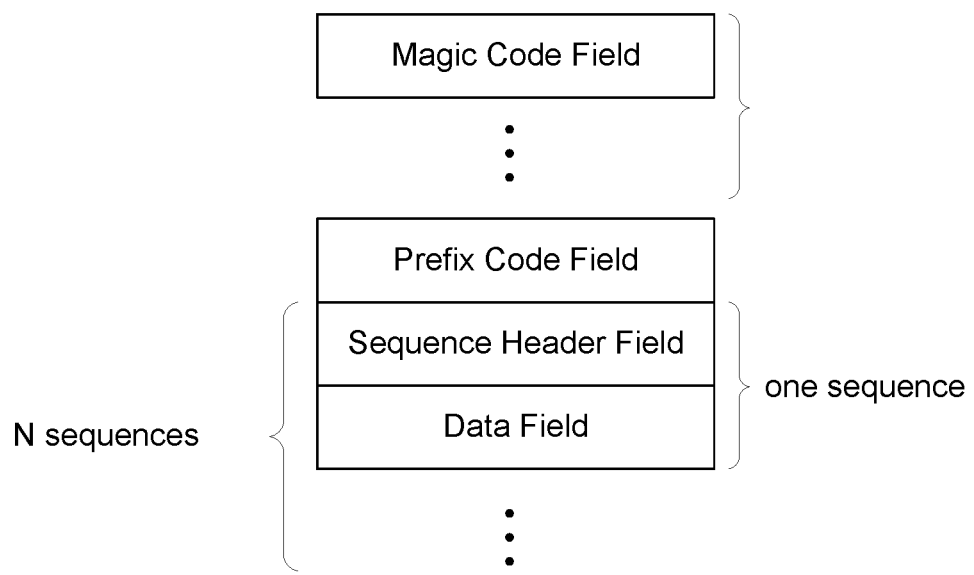
FIG. 13 is a schematic diagram of a link layer data structure that is used to arrange a data field for loading a transmission data in accordance with some embodiments.

FIG. 13 is a schematic diagram of a link layer data structure that is used to arrange a data field for loading a transmission data in accordance with some embodiments.

Referring to FIG. 13, which is a schematic diagram of the link layer data structure, wherein the link layer data structure is divided into two classes: control fields (i.e. fields for control) and data fields (i.e. fields for data). The magic code field (i.e. recognition field, also called data control field 402), prefix code field (i.e. prefix field), sequence header field (i.e. sequence start field) belong to control fields, the data field (i.e. sequence field) belongs to data fields. In the control fields, the identification field is used for being identified, the prefix field is the same as the identification field, which are sent before the sequence start field to represents the formal start of a plurality of sequence. The sequence start field is used for loading a check code of the check data. In the data fields, the sequence field is used for loading the transmission data. The control field and the data field are distinguished by the 7th bit of a byte, the 7th bit of 1 represents data field, and 0 represents control field. In other embodiments, any other bit may be used for the control bit for the control field and the data field, wherein the codes of the control bit in the byte of the control field and the data field are not same. The bit may be any one of 0th bit to 7th bit. Certainly, 0 may represents the data fields, and 1 represents the control fields. The magic code field and sequence start field are distinguished by the 6th bit, and 1 represents the sequence start field while 0 represents the identification field. In other embodiments, other bit also may be used for defining the magic code field and the sequence start field. Certainly, 0 may represents the sequence start field, and 1 represents the identification field.

Figure 14:
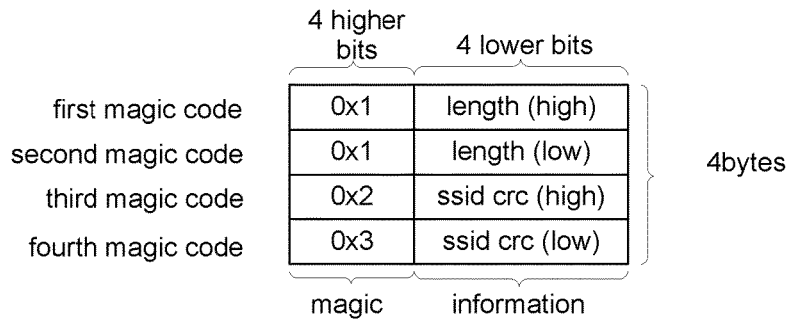
FIGS. 14, 15 and 16 are schematic diagrams of a magic code field, a sequence header and a data field that are configured based on the link layer data structure in accordance with some embodiments, respectively.
Figure 15:
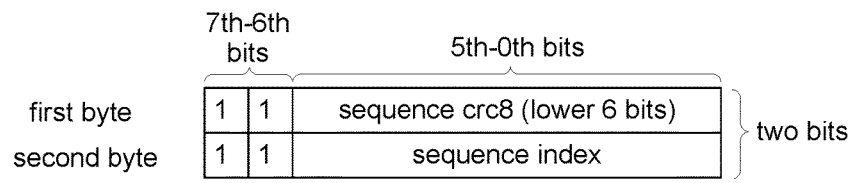
Figure 16:
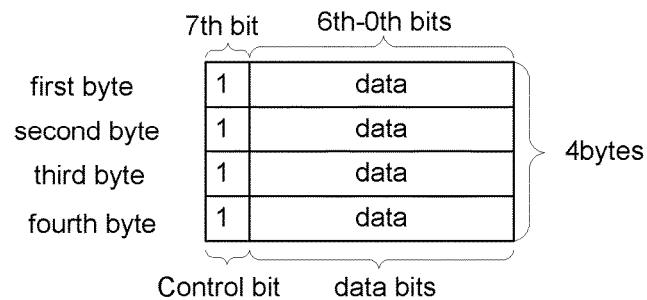

FIGS. 14, 15 and 16 are schematic diagrams of a magic code field, a sequence header and a data field that are configured based on the link layer data structure in accordance with some embodiments, respectively.

Referring to FIG. 14, the identification field includes magic code (i.e. identification byte), and the identification byte includes magic (i.e. identification code) for being identified and information (i.e. information code) for loading information. Particularly, the identification field includes 4 bytes, wherein the higher 4 bits of each byte is the identification code and the lower 4 bits is the information code. The first two bytes of the information code respectively carry the higher 4 bits and lower 4 bits of the length of the data to be sent, and the last two bytes of the information code respectively carry the higher 4 bits and the lower 4 bit of the CRC8 (circular redundancy check code) value of the SSID to be sent. The transmission of CRC8 field of the SSID in control field can optimize the entire transmission procedure.

Before the receiving end receives data, the wireless access points (APs) is scanned, wherein the SSID, RSSI (received signal strength indicator) and channels of all non-hide APs in the wireless environment may be obtained through acquired beacon During transmission procedure, the receiving end first acquires the CRC8 value of the SSID of a target AP, then compares it with the CRC8 value of the SSID obtained by scanning previously. If same value is found, the receiving end will not need to receive the SSID information again in the following procedure of reception, thereby significantly shortening the transmission time.

In one example, firstly identification fields of predetermined number for example 20 are needed to be sent. The wireless network environment in which the receiving end locates may be complicated, for example, there are a plurality of APs in the same space, and these APs may be distributed on same or different channels. Therefore, at beginning, the receiving end cannot know which channel of 1 to 14 is used by the sending end to send information, furthermore numerous devices may be sending UDP broadcast packets on the same channel. In such a case, the receiving end will monitor mass of data packets.

In order to find out the channel used by the sending end and the physical address (i.e. MAC address) of the sending end from the mass of data information, the sending end may send 20 identification fields before sending other information. These identification fields are all composed by 4 bytes and is easy to be identified. Therefore, the receiving end can know and focus on the MAC address and the channel of the sending end, and use them in consequent information monitoring procedure to effectively filter the mass information.

Referring to FIG. 15, the sequence start field includes sequence CRC8 (i.e. sequence circular redundancy check code) and sequence index (i.e. sequence index). The sequence field includes sequence bytes used for loading transmission data. A sequence start field and a sequence field constitute a sequence, and the transmission data may be transmitted carry by a plurality of sequences. In the embodiments, the transmission data to be sent is divided with the grain size of 4 (padding with 0 will be needed if the length of the transmission data cannot be exactly divided), each 4 sequence bytes constitutes a sequence field, and the data is sent in unit of sequence. Furthermore, when the transmission data is sent for predetermine times in order to correct errors, after the transmission data is sent at first time, i.e. after the N sequences including said transmission data is sent at first time, and before start to send again N sequences, a prefix field is sent for one time to represent the start of N sequences. That is to say, when sending repeatedly, the data packet is composed by prefix field, sequence start field and data field, wherein the identification field is optional. The sequence start field is composed by two bytes, wherein the lower six bits of the first byte carry the CRC8 of all sent data from the start of the sequence index to the end of the sequence. After receiving a sequence of data, check for the CRC8 value is performed.

Referring to FIG. 16, the sequence field is composed by 4 bytes, the 7th bit of each byte is the control bit and is fixed as 1, and rest 7 bits are used for loading transmission data. The transmission data includes the SSID and the password of the SSID, as well as a random number used for confirming the reception of the transmission data.

Figure 17:
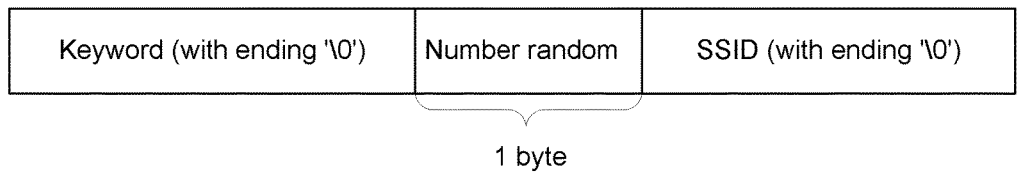
FIG. 17 is a schematic diagram of a data field including a SSID, a SSID password and a random number in accordance with some embodiments.

FIG. 17 is a schematic diagram of a data field including a SSID, a SSID password and a random number in accordance with some embodiments. Wherein the effect of the random number is as follows: after a AP is connected, the data receiving end immediately sends a UDP broadcast packet with the random number as its content; and it can be determined that the receiving end has already received all transmission data correctively, after the sending end has received the broadcast packet. The size of the random number is one byte, and the value of it is smaller than 127. The password and the SSID are all have the end of '\0' and may be encrypted by means of a dictionary, and the corresponding receiving end may use the same dictionary for decryption. The sending sequence of the transmission data is that sending password firstly, then sending the random number and finally sending the SSID, referring to FIG. 17. If the receiving end acquires the CRC8 value of the SSID of a target AP in the identification field, and compares it with the CRC8 value of the SSID obtained by scanning previously, the SSID information sent subsequently may not be received upon the same value is found, thereby significantly shorten the transmission time.

FIG. 18 is a flow chart of a password acquiring method in accordance with some embodiments. The embodiments may particularly be applicable to intelligent device which can locate in the hybrid mode listening space of wireless signal, such as intelligent socket, intelligent control chip of Internet of Things and the like, to acquire a password shared by a wireless terminal such as a mobile phone, a tablet computer and the like which has wireless sending ability. As shown in FIG. 18, the password acquiring method of the embodiments includes following steps:

S220, receiving data packets generated by encoding the transmission data in the encode field, through an encryption channel. The transmission data includes a password. The encode field is a field of the data packet in which the content can be directly monitored on an encryption channel encrypted with a password. This step corresponds with S160. The transmission data may also include a service set identifier, the password is the password of the service set identifier and decoding the encode field also includes acquiring the service set identifier in the transmission data. The device for carrying out the step S220, in hybrid mode, monitors the wireless signal in the space.

For the signal carrier, WIFI wireless signal may be adopted for information transfer. In step S220, the data packet may be user datagram protocol (UDP) based data packet or transmission control protocol (TCP) based data packet. In step S220, the data packet is obtained by receiving the data forwarded by the wireless access point. The wireless access point has large power, so that the coverage area of signal physical space of wireless communication may be increased by its forwarding.

The service set identifier in the data packet is the identifier of the service set of the wireless access point, and the shared password is the password of the service set identifier.

S240, decoding the encode field to obtain the password in the transmission data. The transmission data may be obtained through decoding according to the format corresponding to the encoding.

In the password acquiring method of the embodiments, the data packet is transmitted through encryption channel, in which although the data area of the data packet is encrypted and thus the specific content cannot be known, the encode field is a field of the data packet in which the content can be directly monitored without influence of the encryption channel, so that the content in the encode field can be obtained and decoded to obtain the shared password. The intelligent device for wireless signal locating in hybrid mode listening space such as intelligent socket, intelligent control chip of Internet of Things, electronic photograph album, Intelligent bracelet, smart watch and the like can obtain a password for accessing the wireless network, by receiving data without input unit such as peripheral key, touch screen and the like, thereby reducing the cost for information transfer and making the operation simple and convenient.

As for the data packet and the encode field, please referring to the embodiments shown in FIGS. 18 to 24. Before sending, the data packet is packaged and encrypted in IP layer and data link layer. Therefore, the step S240 includes a step for modifying the length field. In one example, the data packet is sent as UDP broadcast packet. A data packet of UDP layer is first packaged in IP layer and data link layer, encrypted (in manners of WPA2, WPA or WEP) and then is sent out. In this way, the length of UDP broadcast packet sent by the sending end will be different with the value of the field Length monitored finally by the receiving end, therefore modification is needed. It is found that: as long as the length of the UDP broadcast packet is within the limitation range of the MTU (i.e. the UDP packet will not be intersected), the difference between the length of the UDP broadcast packet sent by the sending end and the value of field Length monitored finally by the receiving end is a constant value. And the constant value will not change along with the length change of the UDP broadcast packet, and is only associated with the WIFI encryption manner for the channel. Therefore, as long as the value of the difference under different encryption manner is found out, the receiving end can modify the field Length.

Through a series of experiments, a modification table is obtained as shown in FIG. 19. FIG. 19 is a modification table showing differences of data packet lengths of data packets that are sent by a master device and monitored by a receiver device, respectively, in accordance with some embodiments. AES is the abbreviation of Advanced Encryption Standard, it is a advanced encryption standard. TKIP is the abbreviation of Temporal Key Integrity Protocol, which means temporary key integrity protocol. RC4 is a stream encryption algorithm with variable key length. If WIFI encryption manner is WPA2 (AES), the receiving end intercept a UDP broadcast packet of 802.2 SNAP format in link layer through monitoring, the value of field Length is 152, the receiving end modifies it and obtains the content sent by the sending end as 152−52=100. Therefore, the step of modifying the length field is: subtracting preset modification value from the value of the length field.

In one example, one reception of transmission data is completed through receiving a data packet set composed by a plurality of data packets. FIG. 20 is a flow chart of a flow chart of an operation (S240) of decoding the encode field to obtain the password that is included in the password acquisition method as shown in FIG. 18 in accordance with some embodiments. Referring to FIG. 20, the step S240 include: S242, decoding the plurality of data packets, to sequentially obtain the control field used for being identified and the data field used for loading transmission data, which are encoded in the encode fields of the plurality of data packets. S244, identifying the password included in the transmission data according to the control field, and settings the password as the password of the wireless access point. Setting the password as the password of the wireless access point refers to that the receiving end carrying out the step S240 scans the wireless access points (APs) in advance, obtains the SSID of non-hide AP in the environment by acquiring the beacon, and sets the obtained password as the password of the SSID. The control fields include identification field and sequence start field, wherein the identification field is used for identification, and the sequence start field is used for decoding the obtained check code of the check data. The data fields include sequence field, and the sequence field is used for loading the transmission data.

The sequence start field includes sequence circular redundancy check code, and sequence index. The sequence field includes sequence byte, and the sequence field is used for obtaining the transmission data. After receiving a data packet set, check is performed through sequence circular redundancy check code. If the check fails, the sequence of data is proved to be received with errors, which should be discarded.

In one example, a sequence start field and a sequence field constitute a sequence, and the transmission data may be transmitted by a plurality of sequences. The sequence start field is composed by two bytes, wherein the lower six bits of the first byte carry the CRC8 of all sent data from the start of the sequence index to the end of the sequence. After receiving a sequence of data, check for the CRC8 value is performed. If not same, the sequence of data is proved to be received with errors, which should be discarded.

Before receiving N sequences carrying the transmission data at each time, the prefix field will be received, the SSID CRC8 of the SSID used for decoding may be obtain. The password acquiring method of the embodiments also includes scanning the APs in the environment to obtain an environment service set identifier. The environment service set identifier is checked with the SSID CRC8, if success, giving up receiving the SSID. Before the receiving end receives data, the wireless access points (APs) is scanned, wherein the SSID, RSSI (received signal strength indicator) and channels of all non-hide APs in the wireless environment may be obtained through acquired beacon. During transmission procedure, the receiving end first acquires the CRC8 value of the SSID of a target AP, then compares it with the CRC8 value of the SSID obtained by scanning previously. If same value is found, the receiving end will not need to receive the SSID information again in the following procedure of reception, thereby significantly shortening the transmission time.

In other embodiments, the data packet according to the password sharing method and password acquiring method also may be in the format of Ethernet 802.2 SNAP. FIGS. 21 and 22 are schematic diagrams of two data packets having an Ethernet 802.2 data format and an Ethernet 802.3 data format, respectively, in accordance with some embodiments. As shown in FIG. 21, the encode field is the length field in the data packet in the format of 802.2 SNAP, the others are the same as those in the data packet according to the embodiments of Ethernet 802.2 SNAP. The field Length in FIG. 14 represents the length of following data, which is above-mentioned length field. The field DA represents target MAC address, the field SA represents source MAC address, the field LLC represents LLC head, data field is load, and the field FCS represents the frame check sequence.

The data packet also may is in Ethernet 802.3 format. As shown in FIG. 22, the encode field is the length field in the data packet in the format of Ethernet 802.3, the others are the same as those in the data packet according to the embodiments of Ethernet 802.2 SNAP. The field Length in FIG. 22 represents the length of following data, which is above-mentioned length field. The field DA represents target MAC address, the field SA represents source MAC address, data field is load, and the field FCS represents the frame check sequence.

The data packet also may is in Ethernet 802.3 SNAP format. FIG. 18 is a schematic diagram of the data packet having a 802.2 SNAP data format in accordance with some embodiments. Referring to FIG. 18, the schematic view of the data packet in Ethernet 802.3 SNAP format is the same as those in the data packet according to the embodiments of Ethernet 802.2 SNAP format, wherein, the encode field is the length field in the data packet in the format of Ethernet 802.3 SNAP.

Figure 23:
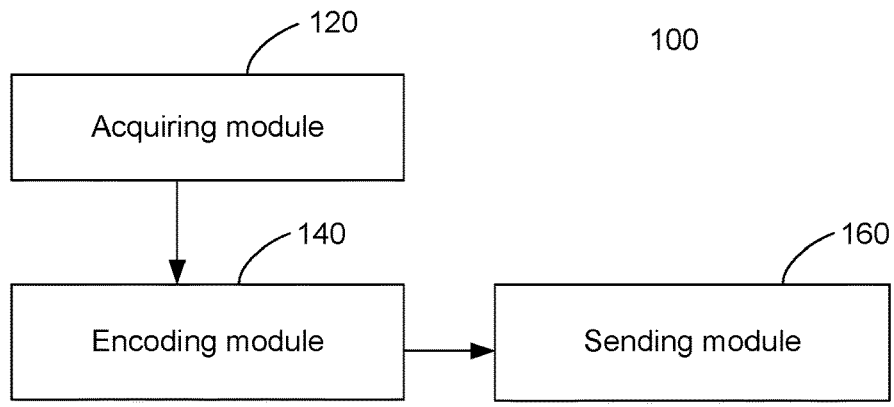
FIG. 23 is a block diagram of an exemplary password sharing system in an electronic device (i.e., a master device) in accordance with some embodiments.

FIG. 23 is a block diagram of an exemplary password sharing system in an electronic device (i.e., a master device) in accordance with some embodiments. The embodiments may be applied in terminals such as mobile phone, tablet computer etc. which is capable to send wireless signal, to share a password of a wireless network to receiving ends of wireless signal in hybrid mode listening space. As shown in FIG. 16, the password sharing system 100 of the embodiments includes following modules:

Acquiring module 120, used for acquiring transmission data to be sent, including a password. The transmission data is the user data which needed to be sent to receiving ends for wireless communication, but not the transmission control data automatically generated by the system for transmission process. The transmission data may also include a service set identifier required for wireless access, the password included in the transmission data is the password of the service set identifier. The transmission data may be acquired by receiving user input, may be acquired through network, or may be acquired from a local memory of the password sharing system 100.

Figure 24:
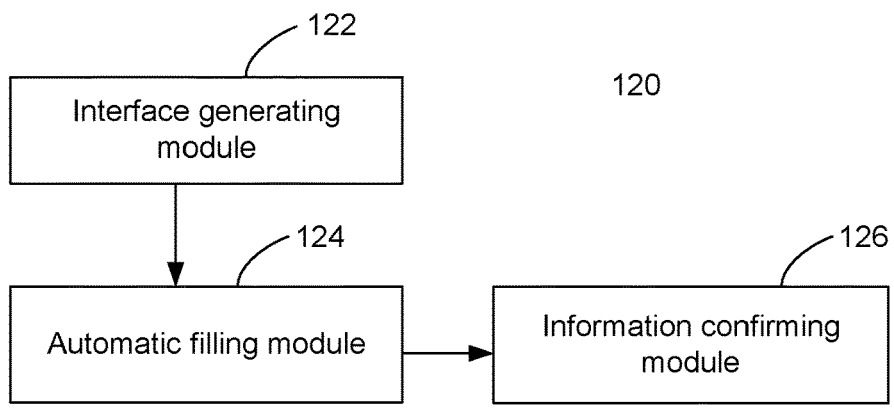
FIG. 24 is a block diagram of a data acquiring module of the password sharing system as shown in FIG. 23 in accordance with some embodiments.

FIG. 24 is a block diagram of a data acquiring module of the password sharing system as shown in FIG. 23 in accordance with some embodiments. Referring to FIG. 10 and FIG. 24, according to the embodiments, the acquiring module 120 includes:

Interface generating module 122, used for generating a sending interface, which includes a service set identifier input box 1222, password input box 1224 and a sending key 1226. The user may input corresponding information in the service set identifier input box 1222 and the password input box 1224.

Automatic filling module 124, used for acquiring the service set identifier of the current service set, and displaying the acquired service set identifier in the service set identifier input box 1222. The service set identifier of the service set in which the device currently locates may be automatically filled into the service set identifier input box 1222 through the background, thereby omitting the troublesome of filling service set identifier by the user. Certainly, as a option, the service set identifier may be inputted by the user manually.

Information confirming module 126, used for, if the sending key 1226 is triggered, acquiring the password within current password input box 1224 and the service set identifier within current service set identifier input box 1222 as the transmission data. When the service set identifier filled automatically through the background is not the needed service set identifier to be sent by the user, the sent service set identifier is the one modified by the user. Because there may be a plurality of service sets at the same physical position, the user locating in one of the service sets may send a service set identifier and password of another service set. For example, in order to assurance the data security, when configuring the wireless access points, they are divided into an entertainment device service set, a working device service set and an intelligence device service set.

Encoding module 140, used for encoding the transmission data in the encode field to generate a data packet, the encode field is a field in the data packet in which the content can be directly monitored on the encryption channel encrypted by a password. The encode field in which the content can be direct directly monitored refers to a field for exposing specific content in a wireless transmission procedure. As long as within the coverage of signal, any receiving end having wireless transmission function can obtain the specific concrete content of the encode field, even though without the password of the wireless communication. In many wireless communication modes, some information in a data packet are not necessary to be secreted, for example the length field and the like in data packet of 802.2 SNAP format, which are exposed directly. The transmission data may be transmitted in plaintext or transmitted with additional encryption, wherein the password for the encryption channel is different to the password for encrypting the transmission data. If the transmission data is encrypted, the receiving end may perform corresponding decryption, wherein the content of the transmission data may be directly obtained without influence from the encryption channel.

In one example, the encode field is a field which may directly controlled by normal application. Because of the limitation of operating system (for example IOS or Android) of a mobile terminal, a control authority of very high level is needed for the control for a field in which the content can be directly monitored, thus those applications for coding is hard to get those control. If a field that can be directly controlled by normal applications is selected as the encode field, a control authority of very high level is not needed to carry out the application of the embodiments, which is not only convenient for use but also keep the security of the system. As a embodiments, the data packet may be in the format of Ethernet 802.2 SNAP, the encode field is the length field in the data packet in the format of Ethernet 802.2 SNAP. The data packet may be in the format of Ethernet 802.2, and the encode field is the length field in the data packet in the format of Ethernet 802.2. The data packet may be in the format of Ethernet 802.3, and the encode field is the length field in the data packet in the format of Ethernet 802.3. The data packet also may be in the format of Ethernet 802.3 SNAP, and the encode field is the length field in the data packet in the format of Ethernet 802.3 SNAP.

Sending module 160, used for sending the data packet through encryption channel. Particularly, the data packet is sent, for example, by using given frequency, power and the like according to the requirement of wireless communication after the data packet is generated.

With foregoing password sharing system 100, since the content of the encode field encoded with the transmission data may be directly monitored, the transmission data may be obtained even though the contents of other fields in the data packet are encrypted and thus cannot be known, thereby realizing object to send a password to a receiving end and receive and obtain the shared password by the receiving end. The receiving end may receive the password only through monitoring, without need of arrangement in advance to establish a connection with environment, and without need of peripheral input unit, thereby reducing the cost for information transmission and making the operation simple and convenient.

For the signal carrier, WIFI wireless signal may be adopted for information transfer. In sending module 160, the data packet may be user datagram protocol (UDP) based data packet or transmission control protocol (TCP) based data packet, which is forwarded through wireless access point. The wireless access point has large power, so that the coverage area of signal physical space of wireless communication may be increased by its forwarding. The service set identifier in the data packet is the identifier of the service set of the wireless access point, and the shared password is the password of the service set identifier.

As a embodiments, the data packet may be in the format of 802.2 SNAP, the encode field is the length field in the data packet in the format of 802.2 SNAP. 802.11 is a wireless LAN protocol set by IEEE, with which the IP packet is carried by the logic link control packaging of 802.2, therefore the wireless network data may be received with 802.2 SNAP format. If the hybrid mode of WIFI chip in the receiving end is enabled, the data packet as shown in FIG. 11 may be obtained by monitoring the wireless signal in space and intercepting the data from the data link layer with 802.2 SNAP format.

The field Length in FIG. 11 represents the length of following data, which is above-mentioned length field. The field DA represents target MAC address, the field SA represents source MAC address, the field LLC represents LLC head (Logical Link Control), and the field SNAP includes a vendor code of 3 bytes and a protocol type identification of 2 bytes. DATA area (data area) is the load, which is cipher text with respect to an encryption channel, and a receiving end cannot know the specific content of the data area before obtaining the password of the encryption channel. The field FCS represents frame checking sequence. With respect to the monitor of the wireless signal namely the receiving end, the fields DA, SA, Length, LLC, SNAP, FCS are always exposed regardless the encryption of the wireless channel, which may be directly monitored. However, with respect to the password sharing system 100 which carry out the method of the embodiments, the control on the five fields DA, SA, LLC, SNAP, FCS needs a control authority of very high level because of the limitation of the operating system (for example IOS or Android), the application for coding in the password sharing system 100 generally is hard to get that control.

Therefore, by using the field Length in which the content can be directly monitored and can be directly controlled by normal application, the application for coding in the password sharing system 100 may has convenient control by changing the length of the data packet sent according to the need.

Figure 25:
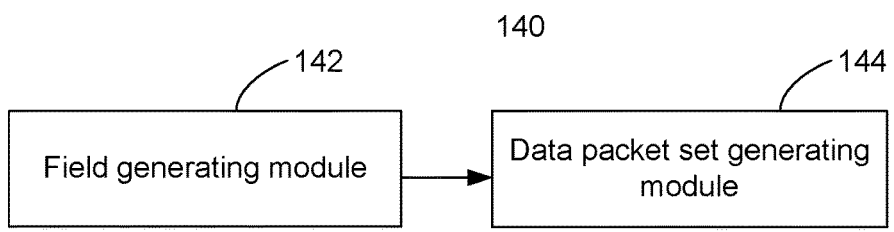
FIG. 25 is a block diagram of a data encoding module of the password sharing system as shown in FIG. 23 in accordance with some embodiments.

Since each data packet can carry fewer data, in some embodiments, one whole transmission data is sent through a data packet set consisting of a plurality of data packets. FIG. 25 is a block diagram of a data encoding module of the password sharing system as shown in FIG. 23 in accordance with some embodiments. Referring to FIG. 25, the encoding module 140 include:

Field generating module 142, used for generating a control field for being identified and a data field for loading a transmission data according to the transmission data.

Data packet set generating module 144, used for sequentially encoding the control field and the data field in the encode fields of a plurality of data packets to generate a plurality of data packets.

By using the control field and data field, in the case that a single data packet has limited transmission data amount, a data transmission with its data amount larger than that of a single data packet may be realized by means of a data packet set. Referring to FIG. 13, which is a schematic diagram of the link layer data structure, wherein the link layer data structure is divided into two classes: control field (i.e. field for control) and data field (i.e. field for data). The magic code field (i.e. recognition field), prefix code field (i.e. prefix field), sequence header field (i.e. sequence start field) belong to control fields, the data field (i.e. sequence field) belongs to data fields. In the control fields, the identification field is used for being identified, the prefix field is the same as the identification field, which are sent before the sequence start field to represents the formal start of a plurality of sequence. The sequence start field is used for loading a check code of the check data. In the data fields, the sequence field is used for loading the transmission data. The control field and the data field are distinguished by the 7th bit of a byte, the 7th bit of 1 represents data field, and 0 represents control field. In other embodiments, any other bit may be used for the control bit for the control field and the data field, wherein the codes of the control bit in the byte of the control field and the data field are not same. The bit may be any one of 0th bit to 7th bit. Certainly, 0 may represents the data fields, and 1 represents the control fields. The magic code field and sequence start field are distinguished by the 6th bit, and 1 represents the sequence start field while 0 represents the identification field. In other embodiments, other bit also may be used for differentiating the magic code field and the sequence start field. Certainly, 0 may represents the sequence start field, and 1 represents the identification field.

Referring to FIG. 14, the identification field includes magic code (i.e. identification byte), the identification byte includes magic (i.e. identification code) for being identified and information (i.e. information code) for loading information. Particularly, the identification field includes 4 bytes, wherein the higher 4 bits of each byte is the identification code and the lower 4 bits is the information code. The first two bytes of the information code respectively carry the higher 4 bits and lower 4 bits of the length of the data to be sent, and the last two bytes of the information code respectively carry the higher 4 bits and the lower 4 bit of the CRC8 (circular redundancy check code) value of the SSID to be sent. The transmission of CRC8 field of the SSID in control field can optimize the entire transmission procedure.

Before the receiving end receives data, the wireless access points (APs) is scanned, wherein the SSID, RSSI (received signal strength indicator) and channels of all non-hide APs in the wireless environment may be obtained through acquired beacon. During transmission procedure, the receiving end first acquires the CRC8 value of the SSID of a target AP, then compares it with the CRC8 value of the SSID obtained by scanning previously. If same value is found, the receiving end will not need to receive the SSID information again in the following procedure of reception, thereby significantly shortening the transmission time.

In one example, firstly identification fields of predetermined number for example 20 are needed to be sent. The wireless network environment in which the receiving end locates may be complicated, for example, there are a plurality of APs in the same space, and these APs may be distributed on same or different channels. Therefore, at beginning, the receiving end cannot know which channel of 1 to 14 is used by the password sharing system 100 to send information, furthermore numerous devices may be sending UDP broadcast packets on the same channel. In such a case, the receiving end will monitor mass of data packets. In order to find out the channel used by the password sharing system 100 and the physical address (i.e. MAC address) of the password sharing system 100 from the mass of data information, the password sharing system 100 may send 20 identification fields before sending other information. These identification fields are all composed by 4 bytes and is easy to be identified. Therefore, the receiving end can know and focus on the MAC address and the channel of the password sharing system 100, and use them in consequent information monitoring procedure to effectively filter the mass information.

Referring to FIG. 15, the sequence start field includes sequence CRC8 (i.e. sequence circular redundancy check code) and sequence index (i.e. sequence index). The sequence field includes sequence bytes used for loading transmission data. A sequence start field and a sequence field constitute a sequence, and the transmission data may be transmitted carry by a plurality of sequences. In the embodiments, the transmission data to be sent is divided with the grain size of 4 (padding with 0 will be needed if the length of the transmission data cannot be exactly divided), each 4 sequence bytes constitutes a sequence field, and the data is sent in unit of sequence. Furthermore, when the transmission data is sent for predetermine times in order to correct errors, after the transmission data is sent at first time, i.e. after the N sequences including said transmission data is sent at first time, and before start to send again N sequences, a prefix field is sent for one time to represent the start of N sequences. That is to say, when sending repeatedly, the data packet is composed by prefix field, sequence start field and data field, wherein the identification field is optional. The sequence start field is composed by two bytes, wherein the lower six bits of the first byte carry the CRC8 of all sent data from the start of the sequence index to the end of the sequence. After receiving a sequence of data, check for the CRC8 value is performed.

Referring to FIG. 16, the sequence field is composed by 4 bytes, the 7th bit of each byte is the control bit and is fixed as 1, and rest 7 bits are used for loading transmission data. The transmission data includes the SSID and the password of the SSID, as well as a random number used for confirming the reception of the transmission data. Wherein the effect of the random number is as follows: after a AP is connected, the password sharing system 100 immediately sends a UDP broadcast packet with the random number as its content; and it can be determined that the receiving end has already received all transmission data correctively, after the password sharing system 100 has received the broadcast packet. The size of the random number is one byte, and the value of it is smaller than 127. The password and the SSID are all have the end of '\0' and may be encrypted by means of a dictionary, and the corresponding receiving end may use the same dictionary for decryption. The sending sequence of the transmission data is that sending password firstly, then sending the random number and finally sending the SSID, referring to FIG. 17. If the receiving end acquires the CRC8 value of the SSID of a target AP in the identification field, and compares it with the CRC8 value of the SSID obtained by scanning previously, the SSID information sent subsequently may not be received upon the same value is found, thereby significantly shorten the transmission time.

Figure 26:
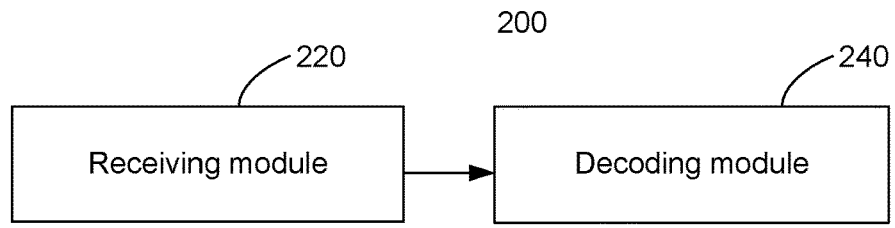
FIG. 26 is a block diagram of an exemplary password acquiring system in an electronic device (i.e., a receiver device) in accordance with some embodiments.

FIG. 26 is a block diagram of an exemplary password acquiring system in an electronic device (i.e., a receiver device) in accordance with some embodiments. The embodiments may particularly be applicable to intelligent device which can locate in the hybrid mode listening space of wireless signal, such as intelligent socket, intelligent control chip of Internet of Things and the like, to acquire a password shared by a wireless terminal such as a mobile phone, a tablet computer and the like which has wireless sending ability. As shown in FIG. 26, the password acquiring system 200 of the embodiments includes:

Receiving module 220, used for receiving data packets generated by encoding the transmission data in the encode field, through an encryption channel. The transmission data includes a password. The encode field is a field of the data packet in which the content can be directly monitored on an encryption channel encrypted with a password. The receiving module 220 corresponds to the sending module 160 of the password sharing system 100. The transmission data may also include a service set identifier, the password is the password of the service set identifier and decoding the encode field also includes acquiring the service set identifier in the transmission data. The receiving module 220, in hybrid mode, may monitor the wireless signal in the space.

Figure 27:
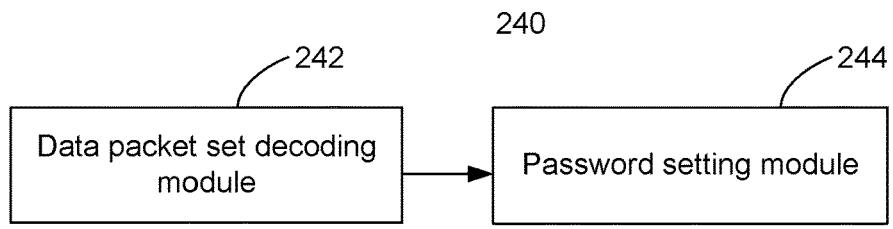
FIG. 27 is a block diagram of a data decoding module of the password acquiring system as shown in FIG. 19 in accordance with some embodiments.

FIG. 27 is a block diagram of a data decoding module of the password acquiring system as shown in FIG. 19 in accordance with some embodiments.

Figure 28:
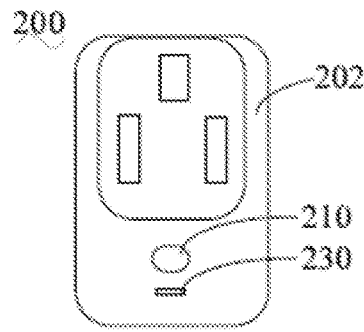
FIG. 28 is a schematic diagram of an exemplary intelligent socket in accordance with some embodiments.
Figure 29:
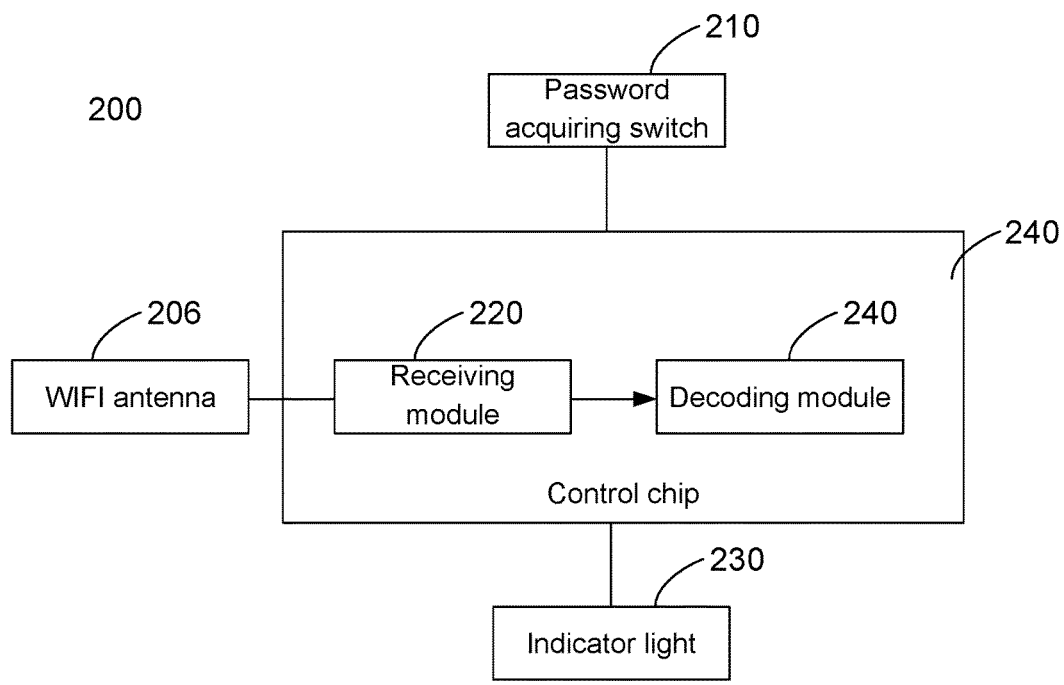
FIG. 29 is a block diagram of another exemplary password acquiring system in an electronic device (i.e., a receiver device) in accordance with some embodiments.

FIG. 28 is a schematic diagram of an exemplary intelligent socket in accordance with some embodiments. FIG. 29 is a block diagram of another exemplary password acquiring system in an electronic device (i.e., a receiver device) in accordance with some embodiments. Referring to FIG. 28 and FIG. 29, the password acquiring system 200 is explained with a example of an intelligent socket. The intelligent socket includes a socket body 202, a control chip 204, a WIFI antenna 206, a password acquiring switch 210 and an indicator light 230. The control chip 204 and the WIFI antenna 206 are arranged in the socket body 202 (a built-out antenna also may be used in other embodiments). The password acquiring switch 210 and the indicator light 230 are arranged on the socket body 202. The WIFI antenna 206, the password acquiring switch 210 and the indicator light 230 are respectively connected with control chip 204, and controlled by the control chip 204. The control chip 204 sets said receiving module 220 and decoding module 240.

WIFI antenna 206 is used to receive the WIFI wireless signal. The password acquiring switch 210 is used to acquire user's switch instruction. The indicator light 230 is used to display the state of the intelligent socket. If the user turns on the password acquiring switch 210, the control chip 204 controls the indicator light 230 to flash, so as to indicate the intelligent socket in receiving state, while the control chip 204 controls the WIFI antenna 206 to receive signal. the WIFI antenna 206 transfers the signal to the control chip 204. The receiving module 220 of the control chip 204 receives the data packets generated by encoding the transmission data in the encode field, through an encryption channel. Decoding module 240 decodes the encode field to obtain the password in the transmission data, and the password is used as the password for wireless network access. Thus the intelligent socket 200 obtains the WIFI password, so as to establish a communication connection with the WIFI network. Therefore, such network control as power-on or power-off can be performed on the devices connected on the intelligent socket 200.

Figure 30:
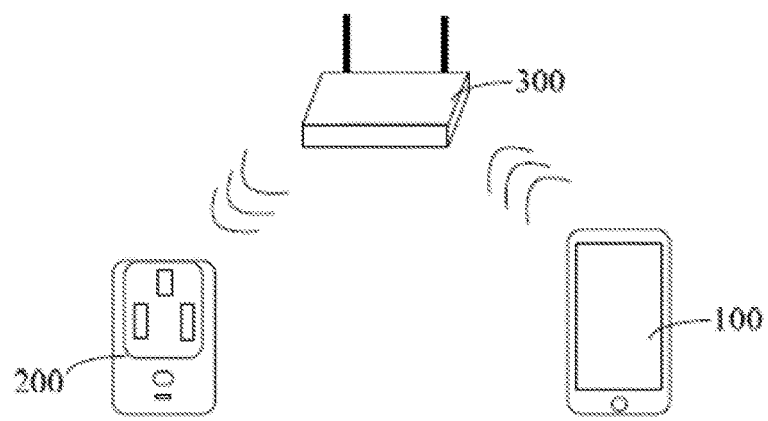
FIG. 30 is a schematic diagram of a password transmission process among a password sharing system, a password acquiring system and a wireless access point in accordance with some embodiments.

For the signal carrier, WIFI wireless signal may be adopted for information transfer. In receiving module 22, the data packet may be user datagram protocol (UDP) based data packet or transmission control protocol (TCP) based data packet. receiving module 220, the data packet is obtained by receiving the data forwarded by the wireless access point. The wireless access point has large power, so that the coverage area of signal physical space of wireless communication may be increased by its forwarding. The service set identifier in the data packet is the identifier of the service set of the wireless access point, and the shared password is the password of the service set identifier. For the procedure of password transmission among the password sharing system 100, the password acquiring system 200 and the wireless access point 300. FIG. 30 is a schematic diagram of a password transmission process among a password sharing system, a password acquiring system and a wireless access point in accordance with some embodiments.

Decoding module 240, used for decoding the encode field to obtain the password in the transmission data. The transmission data may be obtained through decoding according to the format corresponding to the encoding. In the password acquiring system 200 of the embodiments, the data packet is transmitted through encryption channel, in which although the data area of the data packet is encrypted and thus the specific content cannot be known, the encode field is a field of the data packet in which the content can be directly monitored without influence of the encryption channel, so that the content in the encode field can be obtained and decoded to obtain the shared password. The password acquiring system 200 may be an intelligent device for wireless signal locating in hybrid mode listening space, such as intelligent socket, intelligent control chip of Internet of Things, electronic photograph album, Intelligent bracelet, smart watch and the like, can obtain a password for accessing the wireless network, by receiving data without input unit such as peripheral key, touch screen and the like, thereby reducing the cost for information transfer and making the operation simple and convenient.

As for the data packet and the encode field, please referring to the embodiments shown in FIGS. 11 to 17. Before sending, the data packet is packaged and encrypted in IP layer and data link layer. Therefore, the decoding module 240 includes a sub-module for modifying the length field.

In some embodiments, the data packet is sent as UDP broadcast packet. A data packet of UDP layer is first packaged in IP layer and data link layer, encrypted (in manners of WPA2, WPA or WEP) and then is sent out. In this way, the length of UDP broadcast packet sent by the sending end will be different with the value of the field Length monitored finally by the password acquiring system 200, therefore modification is needed. It is found that: as long as the length of the UDP broadcast packet is within the limitation range of the MTU (i.e. the UDP packet will not be intersected), the difference between the length of the UDP broadcast packet sent by the sending end and the value of field Length monitored finally by the password acquiring system 200 is a constant value. And the constant value will not change along with the length change of the UDP broadcast packet, and is only associated with the WIFI encryption manner for the channel. Therefore, as long as the value of the difference under different encryption manner is found out, the password acquiring system 200 can modify the field Length.

Through a series of experiments, a modification table is obtained as shown in FIG. 19. AES is the abbreviation of Advanced Encryption Standard, it is a advanced encryption standard. TKIP is the abbreviation of Temporal Key Integrity Protocol, which means temporary key integrity protocol. RC4 is a stream encryption algorithm with variable key length. If WIFI encryption manner is WPA2 (AES), the receiving end intercept a UDP broadcast packet of 802.2 SNAP format in link layer through monitoring, the value of field Length is 152, the password acquiring system 200 modifies it and obtains the content sent by the sending end as 152−52=100. Therefore, the step of modifying the length field is: subtracting preset modification value from the value of the length field.

In one example, one reception of transmission data is completed through receiving a data packet set composed by a plurality of data packets, referring to FIG. 27, the decoding module 240 include: data packet set decoding module 242, used for decoding the plurality of data packets, to sequentially obtain the control field used for being identified and the data field used for loading transmission data, which are encoded in the encode fields of the plurality of data packets. password setting module 244, used for identifying the password included in the transmission data according to the control field, and settings the password as the password of the wireless access point. Setting the password as the password of the wireless access point refers to that the password acquiring system 200 scans the wireless access points (AP) in advance, obtains the SSID of non-hide AP in the environment by acquiring the beacon, and sets the obtained password as the password of the SSID. The control fields include identification field and sequence start field, wherein the identification field is used for identification, and the sequence start field is used for decoding the obtained check code of the check data. The data fields include sequence field, and the sequence field is used for loading the transmission data. The sequence start field includes sequence circular redundancy check code, and sequence index. The sequence field includes sequence byte, and the sequence field is used for obtaining the transmission data.

After receiving a data packet set, check is performed through sequence circular redundancy check code. If the check fails, the sequence of data is proved to be received with errors, which should be discarded.

In one example, a sequence start field and a sequence field constitute a sequence, and the transmission data may be transmitted by a plurality of sequences. The sequence start field is composed by two bytes, wherein the lower six bits of the first byte carry the CRC8 of all sent data from the start of the sequence index to the end of the sequence. After receiving a sequence of data, check for the CRC8 value is performed.

Before receiving N sequences carrying the transmission data at each time, the prefix field will be received, the SSID CRC8 of the SSID used for decoding may be obtain. The password acquiring method of the embodiments also includes scanning the APs in the environment to obtain an environment service set identifier. The environment service set identifier is checked with the SSID CRC8, if success, giving up receiving the SSID. Before receiving data, the password acquiring system 200 scans the wireless access points (APs), wherein the SSID, RSSI (received signal strength indicator) and channels of all non-hide APs in the wireless environment may be obtained through acquired beacon During transmission procedure, the password acquiring system 200 first acquires the CRC8 value of the SSID of a target AP, then compares it with the CRC8 value of the SSID obtained by scanning previously. If same value is found, the password acquiring system 200 will not need to receive the SSID information again in the following procedure of reception, thereby significantly shortening the transmission time.

The skilled in the art may understand that the whole or part flow of the methods in foregoing embodiments may performed by relevant hardware through the instruction of computer program. The program may be stored in computer readable storage medium, and may implement methods of foregoing embodiments when being carrying out. Wherein, the storage medium may be magnetic disc, optical disc, Read-Only Memory (ROM) or Random Access Memory (RAM) and the like.

Foregoing embodiments only express several implementation modes of the present application, which are specific and detailed, but is not intended to limit the protection range of the present application. For the skilled in the art, some modification and improvement may be made without departing from sprit of the present application, which will fall in the protection scope of the present application. Therefore, the protection scope of the present application should be determined by the claims.

While particular embodiments are described above, it will be understood it is not intended to limit the present disclosure to these particular embodiments. On the contrary, the present disclosure includes alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the embodiments.

Although the terms first, second, etc. may be used herein to describe various elements, these elements should not be limited by these terms. These terms are only used to distinguish one element from another. For example, first ranking criteria could be termed second ranking criteria, and, similarly, second ranking criteria could be termed first ranking criteria, without departing from the scope of the present disclosure. First ranking criteria and second ranking criteria are both ranking criteria, but they are not the same ranking criteria.

The terminology used in the description of the present disclosure herein is for the purpose of describing particular embodiments only and is not intended to be limiting of the present disclosure. As used in the description of the present disclosure and the appended claims, the singular forms "a," "an," and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "includes," and/or "comprising," when used in this specification, specify the presence of stated features, operations, elements, and/or components, but do not preclude the presence or addition of one or more other features, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined [that a stated condition precedent is true]" or "if [a stated condition precedent is true]" or "when [a stated condition precedent is true]" may be construed to mean "upon determining" or "in response to determining" or "in accordance with a determination" or "upon detecting" or "in response to detecting" that the stated condition precedent is true, depending on the context.

Although some of the various drawings illustrate a number of logical stages in a particular order, stages that are not order dependent may be reordered and other stages may be combined or broken out. While some reordering or other groupings are specifically mentioned, others will be obvious to those of ordinary skill in the art and so do not present an exhaustive list of alternatives. Moreover, it should be recognized that the stages could be implemented in hardware, firmware, software or any combination thereof.

The foregoing description, for purpose of explanation, has been described with reference to specific implementations. However, the illustrative discussions above are not intended to be exhaustive or to limit the present disclosure to the precise forms disclosed. Many modifications and variations are possible in view of the above teachings. The implementations were chosen and described in order to best explain principles of the present disclosure and its practical applications, to thereby enable others skilled in the art to best utilize the present disclosure and various implementations with various modifications as are suited to the particular use contemplated. Implementations include alternatives, modifications and equivalents that are within the spirit and scope of the appended claims. Numerous specific details are set forth in order to provide a thorough understanding of the subject matter presented herein. But it will be apparent to one of ordinary skill in the art that the subject matter may be practiced without these specific details. In other instances, well-known methods, procedures, components, and circuits have not been described in detail so as not to unnecessarily obscure aspects of the implementations.

What is claimed is:

1. A data transfer method, comprising: at an electronic device having one or more processors and memory storing programs to be executed by the one or more processors: obtaining, from a wireless access point, a plurality of data packets corresponding to a predefined network access protocol, wherein each data packet comprises a respective data control header and a respective data sequence field that further includes at least one data field and one sequence header field; reconfiguring data communication on a data link layer of the predefined network access protocol by: inserting a service set identifier (SSID) data set in the at least one data field of the respective data sequence field of the plurality of data packets, wherein the SSID data set at least comprises an SSID and an SSID password associated with the wireless access point; inserting a sequence integrity word corresponding to the SSID data set in the sequence header field; and inserting SSID integrity check data corresponding to the SSID data set to a predefined portion of the data control header; and sending the plurality of data packets to a receiver device that is communicatively coupled to the electronic device via the wireless access point, wherein the receiver device is configured to extract the SSID data set from the plurality of data packets, verify the SSID integrity check data, and establish a secure wireless connection using the SSID data set for obtaining data via the wireless access point.

2. The method of claim 1, wherein each data packet includes a data field that is encrypted by an encryption key before the respective data packet is transmitted by the wireless access point, and the encryption key is distinct from the SSID password.

3. The method of claim 1, wherein the SSID is associated with a service set of access point devices that are communicatively coupled to the wireless access point, and the service set includes the electronic device.

4. The method of claim 1, wherein obtaining, from a wireless access point, a plurality of data packets further includes:
generating a user interface that comprises a plurality of user input spaces for receiving inputs of the SSID, the SSID password and a SSID share request;
in accordance with a user input of the SSID, displaying the SSID on one of the plurality of user input spaces; and
responding to the SSID share request by obtaining the SSID password and the SSID that are displayed in the corresponding user input spaces.

5. The method of claim 1, wherein the at least one data field of each data packet includes plain data that the receiver device is configured to read without any password or encryption key.

6. The method of claim 1, wherein the network access protocol associated with the plurality of data packets is selected from an IEEE protocol group consisting of Ethernet 802.2 Subnetwork Access Protocol (SNAP), Ethernet 802.2, Ethernet 802.3 SNAP, and Ethernet 802.3, and the at least one data field is included in a length field that defines a length of each data packet according to the network access protocol.

7. The method of claim 1, wherein the data control header of the SSID data set further comprises a data length, a receiver identification, and the SSID integrity check data, and the data sequence field of the SSID data set further includes the SSID, the SSID password, and a random number.

8. The method of claim 1, further comprising:
after sending the plurality of data packets that include the SSID data set to the receiver device, sending to the receiver device at least one data packet including a specific data field that is encrypted based on the SSID data set and includes a command that controls the receiver device.

9. An electronic device, comprising:
one or more processors;
memory; and
instructions stored in the memory, which, when executed by the one or more processors, cause the processors to perform instructions including:
obtaining, from a wireless access point, a plurality of data packets corresponding to a predefined network access protocol, wherein each data packet comprises a respective data control header and a respective data sequence field that further includes at least one data field and one sequence header field;
reconfiguring data communication on a data link layer of the predefined network access protocol by:
inserting a service set identifier (SSID) data set in the at least one data field of the respective data sequence field the plurality of data packets, wherein the SSID data set at least comprises an SSID and an SSID password associated with the wireless access point;
inserting a sequence integrity word corresponding to the SSID data set in the sequence header field; and
inserting SSID integrity check data corresponding to the SSID data set to a predefined portion of the data control header; and
sending the plurality of data packets to a receiver device that is communicatively coupled to the electronic device via the wireless access point, wherein the receiver device is configured to extract the SSID data set from the plurality of data packets, verify the SSID integrity check data, and establish a secure wireless connection using the SSID data set for obtaining data via the wireless access point.

10. The electronic device of claim 9, wherein each data packet includes a data field that is encrypted by an encryption key before the respective data packet is transmitted by the wireless access point, and the encryption key is distinct from the SSID password.

11. The electronic device of claim 9, wherein the SSID is associated with a service set of access point devices that are communicatively coupled to the wireless access point, and the service set includes the electronic device.

12. The electronic device of claim 9, wherein the instruction for obtaining, from a wireless access point, a plurality of data packets further includes:
generating a user interface that comprises a plurality of user input spaces for receiving inputs of the SSID, the SSID password and a SSID share request;
in accordance with a user input of the SSID, displaying the SSID on one of the plurality of user input spaces; and
responding to the SSID share request by obtaining the SSID password and the SSID that are displayed in the corresponding user input spaces.

13. The electronic device of claim 9, wherein the at least one data field of each data packet includes plain data that the receiver device is configured to read without any password or encryption key.

14. The electronic device of claim 9, wherein the network access protocol associated with the plurality of data packets is selected from an IEEE protocol group consisting of Ethernet 802.2 Subnetwork Access Protocol (SNAP), Ethernet 802.2, Ethernet 802.3 SNAP, and Ethernet 802.3, and the at least one data field is included in a length field that defines a length of each data packet according to the network access protocol.

15. The electronic device of claim 9, wherein the data control header of the SSID data set further comprises a data length, a receiver identification, and the SSID integrity check data, and the data sequence field of the SSID data set further includes the SSID, the SSID password, and a random number.

16. The electronic device of claim 9, wherein the instructions further comprise:
    after sending the plurality of data packets that include the SSID data set to the receiver device, sending to the receiver device at least one data packet including a specific data field that is encrypted based on the SSID data set and includes a command that controls the receiver device.

17. A non-transitory computer readable medium storing at least one program configured for execution by an electronic device, the at least one program comprising instructions for:
    obtaining, from a wireless access point, a plurality of data packets corresponding to a predefined network access protocol, wherein each data packet comprises a respective data control header and a respective data sequence field that further includes at least one data field and one sequence header field;
    reconfiguring data communication on a data link layer of the predefined network access protocol by:
        inserting a service set identifier (SSID) data set in the at least one data field of the respective data sequence field of the plurality of data packets, wherein the SSID data set at least comprises an SSID and an SSID password associated with the wireless access point;
        inserting a sequence integrity word corresponding to the SSID data set in the sequence header field; and
        inserting SSID integrity check data corresponding to the SSID data set to a predefined portion of the data control header; and
    sending the plurality of data packets to a receiver device that is communicatively coupled to the electronic device via the wireless access point, wherein the receiver device is configured to extract the SSID data set from the plurality of data packets, verify the SSID integrity check data, and establish a secure wireless connection using the SSID data set for obtaining data via the wireless access point.

18. The non-transitory computer readable medium of claim 17, wherein each data packet includes a data field that is encrypted by an encryption key before the respective data packet is transmitted by the wireless access point, and the encryption key is distinct from the SSID password.

19. The non-transitory computer readable medium of claim 17, wherein the SSID is associated with a service set of access point devices that are communicatively coupled to the wireless access point, and the service set includes the electronic device.

20. The non-transitory computer readable medium of claim 17, wherein the instructions further comprise:
    after sending the plurality of data packets that include the SSID data set to the receiver device, sending to the receiver device at least one data packet including a specific data field that is encrypted based on the SSID data set and includes a command that controls the receiver device.

* * * * *